United States Patent
Wickstrom et al.

(10) Patent No.: US 6,408,178 B1
(45) Date of Patent: Jun. 18, 2002

(54) SYSTEMS AND METHODS FOR RESOLVING GPS PSEUDO-RANGE AMBIGUITY

(75) Inventors: Daniel Wickstrom, Raleigh; Torbjorn Solve, Cary; Edward V. Jolley, Durham, all of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/280,318

(22) Filed: Mar. 29, 1999

(51) Int. Cl.[7] .................................................. H04Q 7/20
(52) U.S. Cl. ........................ 455/427; 455/424; 342/352; 342/357.06; 342/357.08
(58) Field of Search ............................... 455/18.1, 403, 455/422, 424, 427, 458; 342/352, 355, 357.01, 357.06, 357.08, 357.12; 701/213, 214, 215

(56) References Cited

U.S. PATENT DOCUMENTS

| | | | |
|---|---|---|---|
| 4,797,677 A | * 1/1989 | MacDoran et al. | 342/352 |
| 5,418,538 A | * 5/1995 | Lau | 342/357 |
| 5,442,363 A | * 8/1995 | Remondi | 342/357 |
| 5,467,282 A | * 11/1995 | Dennis | 364/449 |
| 5,528,247 A | * 6/1996 | Nonami | 342/357 |
| 5,949,369 A | * 9/1999 | Bradley et al. | 342/702 |
| 6,012,013 A | * 1/2000 | McBurney | 701/207 |
| 6,052,083 A | * 4/2000 | Hassan et al. | 342/357.04 |
| 6,091,786 A | * 7/2000 | Chen et al. | 375/326 |
| 6,167,274 A | * 12/2000 | Smith | 455/456 |
| 6,172,638 B1 | * 1/2001 | Arethens | 342/357.02 |
| 6,204,808 B1 | * 3/2001 | Bloebaum et al. | 342/375.07 |

FOREIGN PATENT DOCUMENTS

| EP | 087 4248 A2 | 10/1998 |
|---|---|---|
| GB | 2 317536 A | 3/1998 |

* cited by examiner

Primary Examiner—William Trost
Assistant Examiner—Congvan Tran
(74) Attorney, Agent, or Firm—Myers Bigel Sibley & Sajovec

(57) ABSTRACT

Methods and systems are provided for determining a position of a mobile terminal that includes a satellite radiotelephone and a global positioning system (GPS) receiver based on knowledge of the position of the communication satellite spot-beam in which the mobile terminal is located. Using knowledge of the location of the communication satellite spot-beam, the present invention can resolve the one-millisecond ambiguity, that typically arises from the code repeat length where relative code phase may be determined but absolute code phase (i.e. one millisecond increments) could be off by one or more code periods. The spot-beam identifier is obtained from the satellite communication system and used to determine the geographic location of the spot-beam. Trial positions, i.e., candidate mobile terminal positions, are then selected to cover the spot-beam area, with spacing between trial positions provided to account for the one-millisecond ambiguity. Pseudo-range measurements are generated for each trial position and used to generate position fixes. The best position fix, for example a fix selection based on a self-consistency check, is then selected as the mobile terminal's position. In an additional aspect of the present invention, the number of trial positions is reduced by selecting an arc of positions within the spot-beam as trial positions based on timing delay information from the satellite communication system.

32 Claims, 9 Drawing Sheets

Structure of i-th Multiframe

SYSTEMS AND METHODS FOR RESOLVING GPS PSEUDO-RANGE AMBIGUITY

FIELD OF THE INVENTION

The present invention generally relates to wireless communications systems and methods, and more particularly to wireless mobile terminals, systems and methods.

BACKGROUND OF THE INVENTION

Public wireless radiotelephone systems are commonly employed to provide voice and data communications to subscribers. For example, analog cellular radiotelephone systems, such as designated AMPS, ETACS, NMT-450, and NMT-900, have long been deployed successfully throughout the world. Digital cellular radiotelephone systems such as those conforming to the North American standard IS-54 and the European standard GSM have been in service since the early 1990's. More recently, a wide variety of wireless digital services broadly labeled as PCS (Personal Communications Services) have been introduced, including advanced digital cellular systems conforming to standards such as IS-136 and IS-95, lower-power systems such as DECT (Digital Enhanced Cordless Telephone) and data communications services such as CDPD (Cellular Digital Packet Data). These and other systems are described in *The Mobile Communications Handbook*, edited by Gibson and published by CRC Press (1996).

FIG. 1 illustrates a conventional terrestrial wireless communication system 20 that may implement any one of the aforementioned wireless communications standards. The wireless system may include one or more wireless mobile terminals 22 that communicate with a plurality of cells 24 served by base stations 26 and a Mobile Telephone Switching Office (MTSO) 28. Although only three cells 24 are shown in FIG. 1, a typical cellular radiotelephone network may comprise hundreds of cells, may include more than one MTSO 28 and may serve thousands of wireless mobile terminals 22.

The cells 24 generally serve as nodes in the communication system 20, from which links are established between wireless mobile terminals 22 and an MTSO 28, by way of the base stations 26 servicing the cells 24. Each cell 24 will have allocated to it one or more dedicated control channels and one or more traffic channels. The control channel is a dedicated channel used for transmitting cell identification and paging information. The traffic channels carry the voice and data information. Through the communication system 20, a duplex radio communication link 30 may be effected between two wireless mobile terminals 22 or between a wireless mobile terminal 22 and a landline telephone user 32 via a Public Switched Telephone Network (PSTN) 34. The base station 26 generally handles the radio communications between the base station 26 and the wireless mobile terminal 22. In this capacity, the base station 26 may function as a relay station for data and voice signals.

FIG. 2 illustrates a conventional celestial (satellite) communication system 120. The satellite wireless communication system 120 may be employed to perform similar functions to those performed by the conventional terrestrial wireless communication system 20 of FIG. 1. In particular, the celestial wireless communication system 120 typically includes one or more satellites 126 that serve as relays or transponders between one or more earth stations 127 and satellite wireless mobile terminals 122. The satellite 126 communicates with the satellite wireless mobile terminals 122 and earth stations 127 via duplex communication links 130. Each earth station 127 may in turn be connected to a PSTN 132, allowing communications between the wireless mobile terminals 122, and communications between the wireless mobile terminals 122 and conventional terrestrial wireless mobile terminals 22 (FIG. 1) or landline telephones 32 (FIG. 1).

The satellite wireless communication system 120 may utilize a single antenna beam covering the entire area served by the system, or as shown in FIG. 2, the satellite wireless communication system 120 may be designed such that it produces multiple, minimally-overlapping beams 134, each serving a distinct geographical coverage area 136 within the system's service region. A satellite 126 and coverage area 136 may serve a function similar to that of a base station 26 and cell 24, respectively, of the terrestrial wireless communication system 20.

Thus, the satellite wireless communication system 120 may be employed to perform similar functions to those performed by conventional terrestrial wireless communication systems. In particular, a satellite radiotelephone communication system 120 may have particular application in areas where the population is sparsely distributed over a large geographic area or where rugged topography tends to make conventional landline telephone or terrestrial wireless infrastructure technically or economically impractical.

As the wireless communication industry continues to advance, other technologies will most likely be integrated within these communication systems in order to provide value-added services. One such technology being considered is a Global Positioning System (GPS). Therefore, it would be desirable to have a wireless mobile terminal with a GPS receiver integrated therein. It will be understood that the terms "global positioning system" or "GPS" are used to identify any spaced-based system that measures positions on earth, including the GLONASS satellite navigation system.

A GPS system 300 is illustrated in FIG. 3. As is well known to those having skill in the art, "GPS" refers to a space-based trilateration system using satellites 302 and computers 308 to measure positions anywhere on the earth. The term GPS was originally introduced and often is used to refer to a system developed by the United States Department of Defense as a navigational system. However, for purposes of this application, the term GPS refers more generally to both the Department of Defense system and other space-based systems such as GLONASS. Compared to other land-based systems, GPS may be unlimited in its coverage, may provide continuous 24-hour coverage regardless of weather conditions, and may be highly accurate. While the GPS technology that provides the greatest level of accuracy has been retained by the government for military use, a less accurate Standard Positioning Service (SPS) has been made available for civilian use.

In operation, a constellation of 24 GPS satellites 302 orbiting the earth continually emit a GPS radio frequency signal 304 at a predetermined chip frequency. A GPS receiver 306, e.g., a hand-held radio receiver with a GPS processor, receives the radio signals from visible satellites and measures the time that the radio signals take to travel from the GPS satellites to the GPS receiver antenna. By multiplying the travel time by the speed of light, the GPS receiver can calculate a range for each satellite in view. From additional information provided in the radio signal from the satellites, including the satellite's orbit and velocity and correlation to its onboard clock, the GPS processor can calculate the position of the GPS receiver through a process of trilateration.

More particularly, the GPS signal 304 generally consists of a spread-spectrum signal that has a code-length of 1023 chips (bits), and it is transmitted at a chip-rate of 1.023 MHz. This results in a code period of one millisecond. Overlaid on top of the spread-spectrum sequence is a 50 bits/second (bps) navigation message which, typically, contains ephemeris/almanac data as well as timing information which is used to timestamp the transmit time of the signal from the GPS satellite 302. The timestamp, which is generally transmitted in each sub-frame of the 1500 bit navigation message, each sub-frame consisting of 300 bits, is used to calculate the integer number of C/A (coarse acquisition Gold code) code lengths between the GPS satellite 302 and current position of GPS receiver 306.

Because of the slow transmission rate (50 bps) of the navigation message, it typically takes at least 6 seconds to decode a sub-frame of the navigation message. Because the start of decoding is asynchronous, the decoding of the timestamp could take up to twelve seconds. On average, it takes 9 seconds to decode a sub-frame and extract the timestamp in order to resolve the one millisecond ambiguity (from the code period).

The code-phase measurements for the GPS SPS signal have a one-millisecond ambiguity due to the inherent nature of the received GPS spread-spectrum signal. The spread-spectrum signal is generated by repeatedly transmitting a unique Gold-code for each of the GPS satellites. Each of the Gold-codes is 1023 chips (bits) in length, and they are transmitted at a 1.023 chips/sec rate. The chip length divided by the chip rate gives the Gold-code period of one millisecond. Measurement of the code phase determines the fractional number of Gold-code lengths between the GPS satellite and the GPS receiver. The problem remains of determining the integer number of code periods between the GPS satellite and the GPS receiver. This is typically resolved by decoding at least one sub-frame of the navigation message that is over-laid on top of the spread-spectrum signal using 50 bps BPSK modulation. Each sub-frame in the navigation message contains a time-stamp that represents the time of transmission of the sub-frame. The GPS receiver extracts the time-stamp from the naviagion message and subtracts it from the current time to estimate the integer number of code-periods from the GPS satellite and the GPS receiver. If the receiver estimate of the GPS time is in error the time-bias will be common to all of the pseudo-range measurements, and it may be removed when the point fix solution is calculated.

Before the data can be demodulated, the receiver generally needs to acquire the GPS signal 304 and achieve code and carrier lock. As well as increasing the time to obtain a GPS position fix, demodulating the GPS navigation data complicates the design of the GPS receiver 306.

It is known to combine a GPS receiver and radio communication receiver which receives information, such as GPS satellite Doppler information from a terrestrial base station, for use in determining position as described in U.S. Pat. No. 5,663,734 to Krasner entitled "GPS Receiver and Method for Processing GPS Signals". It is also known to provide a GPS receiver with GPS satellite position information transmitted over a communication channel supported by terrestrial cellular telephone or other radio packet data services as described in U.S. Pat. No. 5,365,450 to Schuchman entitled "Hybrid GPS/Data Line Unit for Rapid, Precise, and Robust Position Determination". In addition, various proposals have been submitted to the T1 Standards Committee of the European Telecommunications Standard Institute (ETSI) regarding assisted GPS for GSM radiotelephone communication systems as described in the submittal entitled "Evaluation Worksheet for Assisted GPS" by Ericsson and SnapTrack submitted to the T1P1 working group (of the European Telecommications Standard Institute ETSI) on Jun. 3, 1998. Each of these approaches is generally directed to reducing the time required to determine a position from the GPS data and provide for the transfer of information about the GPS satellites to a combined mobile terminal/GPS receiver from communication networks, such as a terrestrial cellular network. However, these approaches typically require advantaged (clear) communication with the positioning/communication terminal and transfer of specific GPS satellite information to facilitate acquisition and calculation of position.

SUMMARY OF THE INVENTION

It is, therefore, an object of the present invention to resolve the problem of determining a position quickly and effectively from GPS satellite communications.

More particularly, it is an object of the present invention to resolve the one-millisecond ambiguity in GPS pseudo-range measurements.

It is a further object of the present invention to resolve the one-millisecond ambiguity in GPS pseudo-range measurements while reducing processing requirements which are required to be carried out by battery powered devices.

These and other objects are provided, according to the present invention, by providing methods and systems for determining a position of a mobile terminal that includes a satellite radiotelephone and a global positioning system (GPS) receiver based on knowledge of the position of the communication satellite spot-beam in which the mobile terminal is located. Using knowledge of the location of the communication satellite spot-beam, the present invention can resolve the one-millisecond ambiguity, that typically arises from the code repeat length where relative code phase may be determined but absolute code phase (i.e. one millisecond increments) could be off by one or more code periods. The spot-beam identifier is obtained from the satellite communication system and used to determine the geographic location of the spot-beam. Trial positions, i.e., candidate mobile terminal positions, are then selected to cover the spot-beam area, with spacing between trial positions provided to account for the one-millisecond ambiguity. Pseudo-range measurements are generated for each trial position and used to generate position fixes. The best position fix, for example a fix selection based on a consistency check, is then selected as the mobile terminal's position. In an additional aspect of the present invention, the number of trial positions is reduced by selecting an arc of positions within the spot-beam as trial positions based on timing delay information from the satellite communication system.

In one embodiment of the present invention, a method is provided for determining a position of a mobile terminal. An identification of a spot-beam in which the mobile terminal is located is obtained from a satellite radiotelephone system communication and a plurality of trial positions within the spot-beam are generated. Candidate position fixes for the mobile terminal are generated for at least two of the plurality of trial positions based on GPS signals received by the mobile terminal from a plurality of global positioning system (GPS) satellites. One of the determined candidate position fixes is then selected as the position of the mobile terminal.

The candidate position fixes may be determined by calculating a plurality of initial pseudo-range estimates corresponding to the plurality of GPS satellites for one of the plurality of trial positions based on the GPS signals received by the mobile terminal, the GPS signals having a code length, including determining fractional code periods from the received GPS signals. The initial pseudo-range estimates may then be adjusted to produce a plurality of candidate pseudo-range estimates for the mobile terminal for the one of the plurality of trial positions and the candidate position fix for the mobile terminal may then be generated for the one of the plurality of trial positions based on the plurality of candidate pseudo-range estimates. The calculating, adjusting and generating operations may be repeated for each of the plurality of trial positions.

In one embodiment of the present invention, adjusting operations include truncating each of the initial pseudo-range estimates to produce a corresponding plurality of integer code length distances for the one of the plurality of trial positions and adding distances corresponding to the fractional code periods derived from the received GPS signals to the plurality of integer code length distances to provide a corresponding plurality of candidate pseudo-range estimates for the mobile terminal. Alternatively, adjusting operations may include modifying the plurality of initial pseudo-range estimates to account for relative differences between the fractional code periods derived from the received GPS signals to provide a corresponding plurality of candidate pseudo-range estimates for the mobile terminal. Range and position fix calculations may be carried out by the mobile terminal or at a remote location.

In another embodiment of the present invention, the calculating, adjusting and generating operations may be repeated for each of the plurality of trial positions to provide candidate position fixes for the mobile terminal for each of the plurality of trial positions. In another aspect of the present invention, the plurality of GPS satellites are first selected from visible GPS satellites based on the elevation of the visible GPS satellites relative to one of the plurality of trial positions.

In one embodiment of the present invention, the position fixes are least squares position fixes and at least four GPS satellites are used in determining position fixes. One of the candidate position fixes is then selected as the position of the mobile terminal based on a self-consistency check. The selection may be made using an overdetermined set of equations. In a particular embodiment, the selection is made by Q-R decomposing a direction cosine matrix determined from the candidate position fixes and multiplying non-constrained dimensions of a transpose of a Q matrix by delta pseudo-range values from the candidate position fixes.

In a further embodiment of the present invention, each of the trial positions is located no more than approximately 150 kilometers of another of the plurality of trial positions. The plurality of trial positions are generated on a grid covering the spot-beam. The spot-beam identifier is received from the satellite radiotelephone system communication and a geographic location of the spot-beam is calculated based on the received spot-beam identifier. The location calculation may be based on satellite ephemeris data obtained from the satellite radiotelephone system communication and antenna direction coordinates or, alternatively, on boundary points for the spot-beam stored in the mobile terminal.

In a further aspect of the present invention, satellite communication timing information is also obtained from the satellite radiotelephone system communication and the plurality of trial positions is generated based on the obtained timing information. The timing information may be timing delay information in which case the plurality of trial positions are selected along an arc of positions substantially equidistant from a satellite transmitting the satellite radiotelephone system communication based on the timing delay information. Depending on the accuracy of the timing delay information, the plurality of trial positions may be selected along at least one arc of positions substantially equidistant from a satellite transmitting the satellite radiotelephone system communication based on the timing delay information wherein each of the trial positions is located no more than approximately 150 kilometers of another of the plurality of trial positions.

In one embodiment of the present invention, the satellite communication timing information is requested from a satellite radiotelephone system satellite on a high margin random access channel. The satellite communication timing information is received from the satellite radiotelephone system satellite on a high margin paging channel. In an embodiment where the timing information is timing delay information, a request is transmitted which includes a timing update request having a request number identifier and a timing update is then received having an associated identifier corresponding to the request number identifier.

In another embodiment of the present invention, a GPS signal is received at the mobile terminal from each of the plurality of GPS satellites. A code phase is determined for each of the plurality of GPS satellites from the received GPS signals at the mobile terminal. The determined code phases are then provided to a remote GPS station from the mobile terminal which determines the candidate position fixes and selects one as the position of the mobile terminal.

While the present invention has generally been described above with reference to method aspects of the present invention, it is to be understood that the present invention also provides for mobile terminals and systems for determining a position of a mobile terminal.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices. Accordingly, the present invention may take the form of an entirely hardware embodiment, an entirely software embodiment or an embodiment combining software and hardware aspects. Like numerals refer to the same items throughout the present disclosure.

Figure 3:
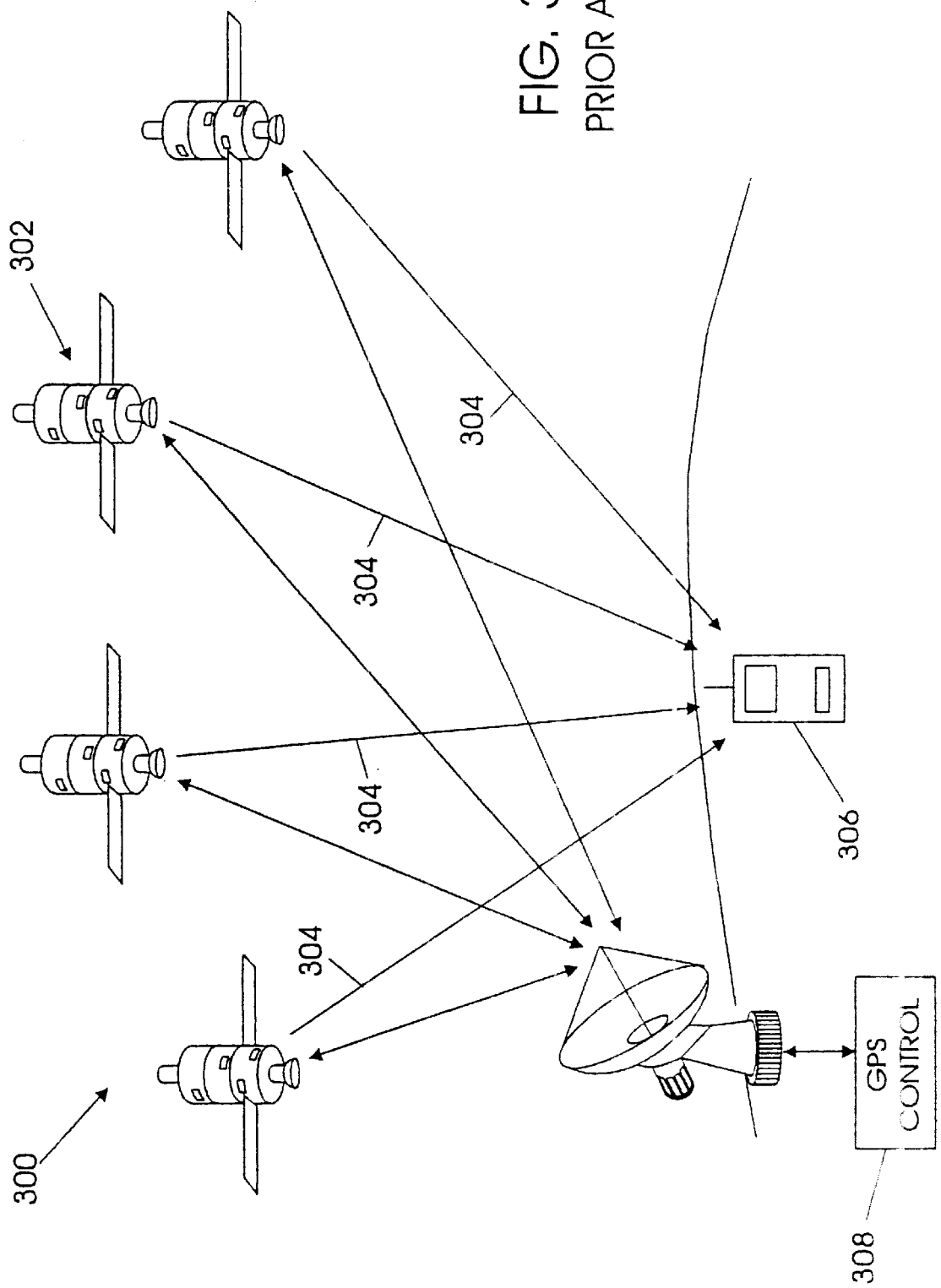
FIG. 3 illustrates a conventional global positioning system (GPS).
Figure 4:
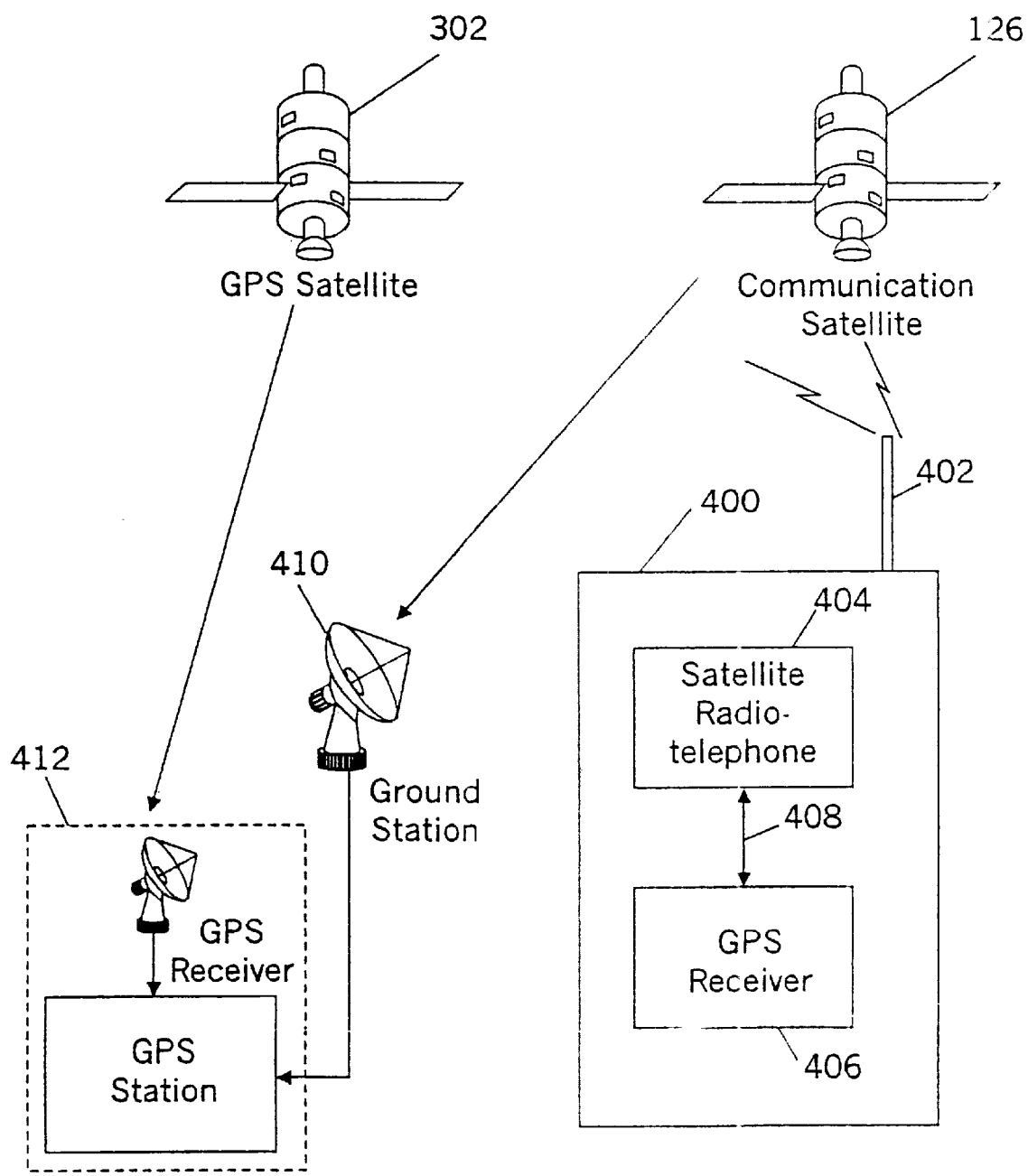
FIG. 4 is a block diagram of a mobile terminal interfaced to GPS and wireless communication systems according to an embodiment of the present invention.

More specifically, referring to FIG. 4, a block diagram of a mobile terminal according to the present invention is illustrated. It will be understood that mobile terminal 400 may be used in place of a satellite wireless mobile terminal 122 of FIG. 2 and a GPS receiver 306 of FIG. 3, at locations that are served by both a satellite communication system 120 (FIG. 2) and a GPS system 300 (FIG. 3). It is also to be understood that, while the present invention will be described with reference to satellite communication systems, it can be beneficially utilized to address time ambiguity in any number of different systems with an ability to identify a geographic region in which a mobile terminal is located.

Figure 1:
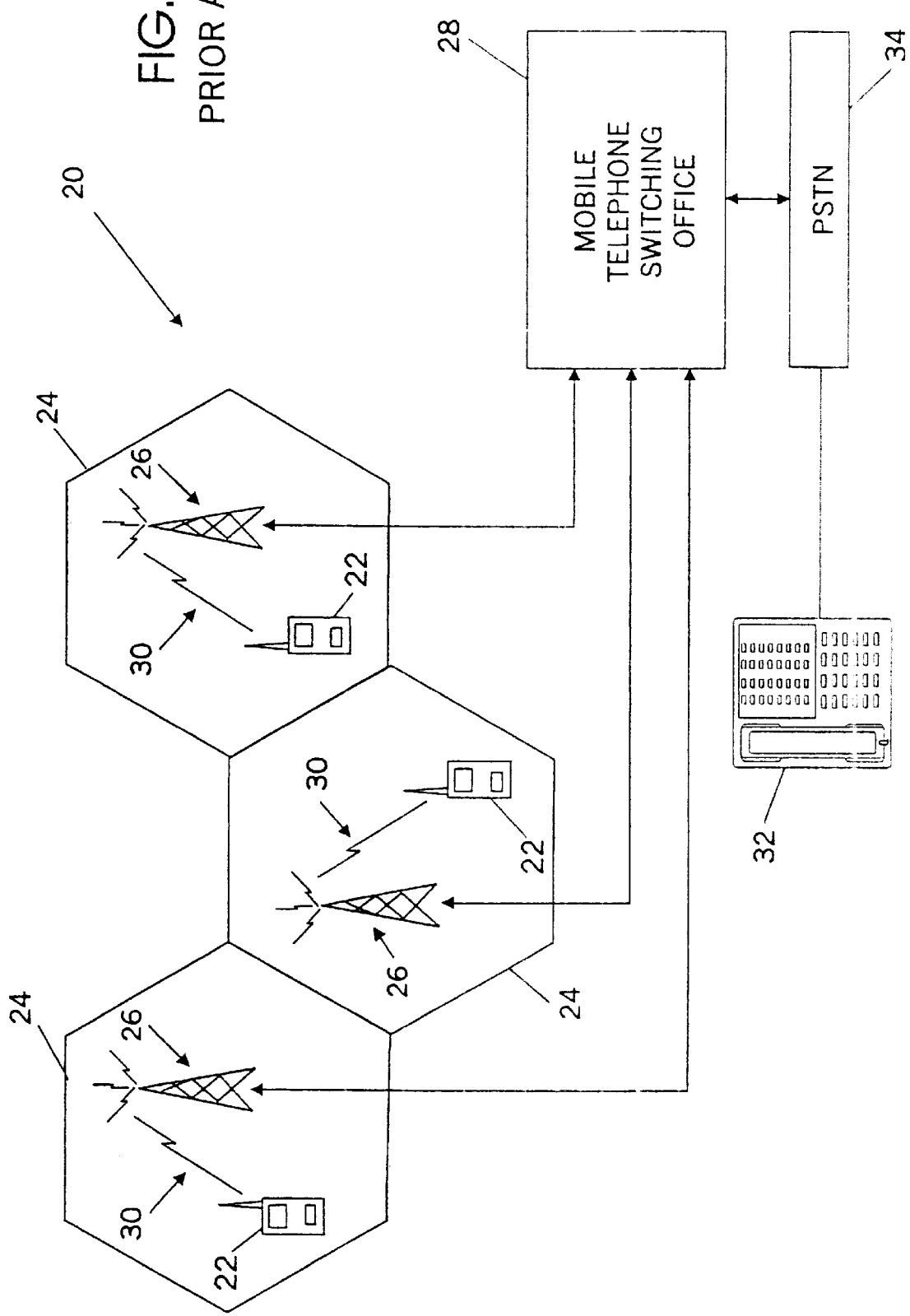
FIG. 1 illustrates a conventional terrestrial (cellular) wireless communication system.
Figure 2:
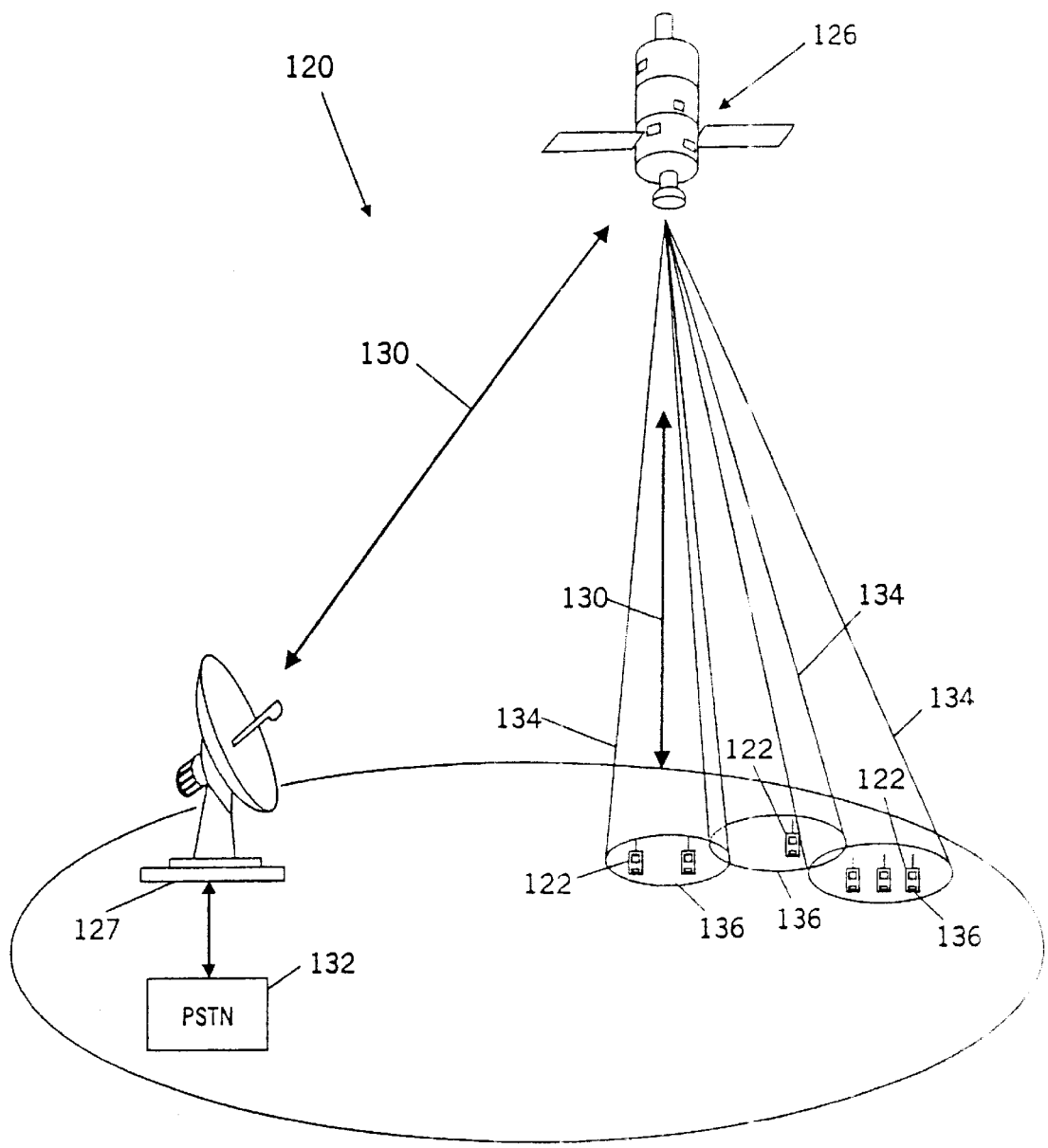
FIG. 2 illustrates a conventional celestial (satellite) wireless communication system.

As shown in FIG. 4, mobile terminal 400 includes a satellite radiotelephone 404 that is configured to provide for communications through communication satellite 126 of a satellite communication network 120 such as that illustrated in FIG. 2. More particularly, satellite radiotelephone 404 is configured to provide for receipt of a spot-beam identifier and timing delay information from communication satellite 126. A GPS receiver 406 within mobile terminal 400 is configured to receive GPS signal transmissions 304 from GPS satellite 302. While only a single GPS satellite 302 is illustrated in FIG. 4, it is to be understood that a plurality of GPS satellites within the visible range of mobile terminal 400 provide signals which may be received by GPS receiver 406 and used in determining a position of mobile terminal 400. In addition, while only a single antenna 402 is shown in FIG. 4, separate antennas may be provided for receiving signals from GPS satellite 302 and communication satellite 126, respectively.

As illustrated by connection 408, GPS receiver 406, according to one embodiment of the present invention, further receives spot-beam identification information and, optionally, timing delay information from satellite radiotelephone 404 for use in computing the position of mobile terminal 400. GPS receiver 406 further may receive GPS satellite ephemeris and timing information (which may be obtained from remote GPS station 412 coupled to satellite communication ground station 410) from satellite radiotelephone 404 for use in computing the position of mobile terminal 400.

Furthermore, in an alternative embodiment of the present invention, the GPS receiver 406 receives GPS signals 304 from GPS satellite 302 and determines code phase (shift), which information is provided through satellite radiotelephone 404 to remote GPS station 412 for position fix calculation. In this embodiment, GPS receiver 406 need not obtain ephemeris information from satellite radiotelephone 404.

In order to estimate the distance from each GPS satellite in view to the current position of GPS receiver 306, the GPS receiver 306 typically measures the relative code shift of the received spread-spectrum signal. The pseudo-range is then computed as shown in equation (1).

$$PR = c(t_r - t_t) \tag{1}$$

where: PR=Pseudo-range
c=Speed of light
$t_t$=Time of satellite transmission
$t_r$=Time of code reception The time of satellite transmission is generally determined by adjusting the time of transmission of the decoded sub-frame in the navigation message by the relative code shift of the received spread-spectrum signal. The time of transmission of each sub-frame is typically encoded in each sub-frame block.

As will be described further herein, if the time of transmission is not known, a set of pseudo-ranges associated with a selected plurality of GPS satellites 302 can still be estimated if the position of GPS receiver 306 is known to within 150 kilometers. Each of these initial pseudo-range estimates is then adjusted to account for the relative differences between the fractional code period measurements made by the GPS receiver 306. An accurate position fix can be generated from the resulting set of adjusted pseudo-range estimates using known techniques. However, in various communication systems, such as the ACeS system, spot-beams project elliptical patterns on the earth's surface which have major axis lengths may easily exceed 1000 kilometers. As a result, knowing the location of the spot-beam alone is generally not sufficient for developing a usable set of pseudo-range estimates without decoding the navigation message.

The computed position information may be displayed, or may be broadcast, for example, through satellite communication system 120, or used for other purposes as is conventionally known. It will also be understood that mobile terminal 400 may further include conventional user interface elements, such as keypads and displays and other electronic components known to those having skill in the art. Therefore, these aspects of satellite radiotelephone 404 will not be further described herein except as they relate to the present invention.

As will be appreciated by those of skill in this art, the above-described aspects of the present invention in FIG. 4 may be provided by hardware, software, or a combination of the above. Although various components of mobile terminal 400 have been illustrated as discrete components, they may also, in practice, be implemented in an integrated fashion using a microcontroller including input and output ports and running software code, by custom or hybrid chips, by discrete components or by a combination of the above. For example, all or some of the components represented by GPS receiver 406 may be implemented using code executing on a microprocessor or a digital signal processor, or by an application specific integrated circuit (ASIC).

Referring now to the flowchart illustration of FIG. 5, operations according to an embodiment of the present invention for determining a position of a mobile terminal that includes a satellite radiotelephone and a global positioning system receiver will now be described. At block 420, an identification of a spot-beam in which the mobile terminal is located is obtained from the satellite communication system 120 based on a communication on a wireless link from communications satellite 126. For example, in the Asian Cellular Satellite (ACeS) communication system, the spot-beam identifier can be obtained by reading the High Penetration Broadcast Control Channel (HBCCH). The location of the spot-beam can then be calculated based on knowledge of the satellite system coverage or, as an alternative, spot-beam boundary points stored in memory of mobile terminal 400 may be used in determining spot-beam location.

As will be described further herein, this obtained knowledge of the location of the current spot-beam in which mobile terminal 400 is located will be used to resolve the one millisecond GPS pseudo-range ambiguity to arrive at the position of mobile terminal 400. Of course, this approach assumes that mobile terminal 400 is able to decode the HBCCH so that it can determine the spot-beam identifier. However, the HBCCH is specifically provided so as to allow receipt of communications even by a disadvantaged mobile terminal. The spot-beam location, as is known to those of skill in the art, may be calculated using a combination of satellite ephemeris data and antenna direction coordinates. As an alternative, boundary points defining the location of each spot-beam could be stored in memory of mobile terminal 400 and indexed based upon spot-beam identifier.

At block 422, mobile terminal 400 measures the code phase (shift) of signals 304 received by GPS receiver 406 from each of a plurality of visible GPS satellites 302. The code phase (shift) readings will be used in calculating pseudo-ranges and position fixes as described further herein.

Using the methods and systems of the present invention, the code phase readings from a set of GPS satellites 302 are all that is required from the GPS signals 304 as the ephemeris/almanac and timing information may be obtained through alternative sources. The remaining GPS calculation information may be received by mobile terminal 400, for example, from satellite communication system 120. Alternatively, mobile terminal 400 may simply provide a remote GPS station 412, which does obtain timing and ephemeris data from the GPS satellites 302, the code phase measurements and spot-beam identifier (or other means to calculate the spot-beam location) so that the remaining operations to be described with reference to FIG. 5 need not be performed by mobile terminal 400. It is to be understood that the spot-beam information may be provided directly by mobile terminal 400 along with the code phase measurements or may be provided to the remote GPS station 412 by satellite communication system 120 which is also aware of what spot-beam mobile terminal 400 is located within.

Operations will now be described for the embodiment in which the calculations are performed by mobile terminal 400. Once mobile terminal 400 determines the location of the current spot-beam in which it is located, it generates a list of positions within the current spot-beam geographic coverage area to use as a set of trial positions for computing position fixes (block 424). In the illustrated embodiment, the plurality of trial positions are selected from locations on a grid covering the spot-beam. As illustrated by the "X" symbols in FIG. 6, the trial positions are preferably located on a grid such that each trial position is located no more than approximately 150 kilometers from another of the plurality of trial positions.

It is known that GPS determinations are generally based on measurements taken from a plurality of GPS satellites 302, preferably a set of at least 5 such GPS satellites. These measurements from 5 GPS satellites typically provide for a location determination including latitude, longitude, altitude and time reference. Therefore, at block 422, a plurality of GPS satellites 302 are selected from the visible GPS satellites based on the elevation of the visible GPS satellites relative to one of the plurality of trial positions. Satellites with high elevations have lower probabilities of having an ambiguous pseudo-range and, therefore, are preferable for use according to the methods of the present invention.

Operations for estimating pseudo-ranges (block 428) may vary based on the accuracy of the GPS time information available as will now be described (along with their relation to operations at blocks 430 and 432) with reference to embodiments of operations for estimating pseudo-ranges suitable for use with the present invention under various conditions. However, it is to be understood that other techniques for estimating pseudo-ranges known to those of skill in the art may also be beneficially used according to the present invention.

(1) Pseudo-range Estimate Generation when GPS Time is Precisely Known

As used herein for the description of this embodiment, "precisely known" refers to a user receiver initial GPS system time estimate accurate to within ±5 $\mu$s (or better). Under these conditions, the time estimate is expected to be accurate to within ±0.5% of the 1 ms GPS code epoch. The operations described herein further are preferably carried out by a user (GPS) receiver able to align its 1 ms timing strobe with this time estimate. For a given trial position, a user location is assumed for each trial position to be within 150 km of the trial position. Furthermore, the user receiver preferably measures a "snapshot" of code phases from at least 5 GPS satellites.

Under these conditions, with GPS system time accurately known, the task of calculating an initial set of five or more pseudo-range estimates for a particular trial position is relatively straightforward. To estimate one of these initial pseudo-ranges, the receiver computes the position of the target satellite at the precise time of interest and subtracts from it the known position of the trial position concerned. The magnitude of the resulting vector quantity serves as the initial pseudo-range estimate. Next, each of these initial pseudo-range estimates is adjusted to enable its use in the computation of a GPS fix. Conveniently, the precise knowledge of absolute GPS time allows these initial pseudo-range estimates to be adjusted independently of one another.

The adjustment step for an individual pseudo-range estimate consists of two parts. First, the pseudo-range estimate (in milliseconds) is truncated to an integer number of milliseconds. Truncation operations may be based upon the difference between the fractional portion of the initial pseudo-range estimate and the corresponding code phase measurement produced by the user receiver. This approach is based on the fact that a code phase measurement generally cannot deviate from the fractional portion of the estimate by more than ½ ms if the position uncertainty is constrained to within approximately 150 km. The calculations are as follows where "frac" is the fractional portion of initial pseudo-range estimate for $i^{th}$ satellite (in msec) and "codephase" is the code phase measured by user receiver for $i^{th}$ satellite (in msec):

IF|frac−codephase|<0.495 ms; 0.495 ms=(1 ms/2)−5 $\mu$s
   THEN truncate initial pseudo-range estimate
IF|frac−codephase|>=0.495 ms
   IF (frac>codephase); roll-over
     THEN add 1 ms to initial pseudo-range estimate and then truncate
   IF (frac<codephase); roll-under
     THEN subtract 1 ms from initial pseudo-range estimate and then truncate With truncation performed in a manner that accounts for 1 ms roll-over/under conditions as above, the second step is to add the code phase measurement to its corresponding truncated initial pseudo-range estimate. Once five or more of these pseudo-range estimates are properly adjusted, the receiver may proceed to generate a GPS position fix according to known techniques such as least squares.

These truncation rules generally apply only when the user's position uncertainty with respect to a particular trial position is limited to approximately 150 km. Furthermore, as the uncertainty in the user's initial GPS system time estimate increases (for example from ±5 μs), the size of the test region considered should be reduced to compensate for this increased uncertainty. Such trade-offs between time and position uncertainties can typcially be made until time errors exceed ±500 μs (½ code period).

(2) Pseudo-range Estimate Generation when GPS Time is Approximately Known

The embodiment described herein is preferably used when the user receiver initial GPS system time estimate accurate to within ±1 ms (or worse). Under these conditions, the GPS time uncertainty is expected to span at least one 1 ms GPS code period (epoch) and the user receiver 1 ms timing strobe is not expected to have a meaningful relationship to absolute GPS time. For a given trial position, a user location is assumed for each trial position to be within 75 km of the trial position. Furthermore, the user receiver preferably measures a "snapshot" of code phases from at least 5 GPS satellites.

The task of calculating an initial set of five or more initial pseudo-range estimates for a particular trial position will now be described. To estimate one of these initial pseudo-ranges, the user receiver computes the position of the target satellite at the approximate time of interest and subtracts from it the known position of the trial position concerned. The magnitude of the resulting vector quantity serves as the initial pseudo-range estimate. Next, each of these initial pseudo-range estimates is adjusted to enable its use in the computation of a GPS fix. Unfortunately, with an imprecise knowledge of absolute GPS time, it is generally not possible to independently adjust these pseudo-range estimates. Consequently, the relationships that exist between pseudo-range estimates is considered throughout the adjustment process.

In general, the adjustment process can commence by arbitrarily labeling the five (or more) code phase measurements. Consider this first code phase measurement to be cp1 and the others to be cp2, cp3, cp4 and cp5. Also consider their corresponding initial pseudo-range estimates at the trial position to be ipr1, ipr2, ipr1, ipr4 and ipr5 respectively. For example, two of the code phase measurements and their associated initial pseudo-range estimates may look like the following:

| cp1 = 900.0 chips | ipr1 = 72.4 ms | (for satellite_1) |
| cp2 = 393.1 chips | ipr2 = 84.2 ms | (for satellite_2) |

Note that code phase measurements (in code-chips) exist on the interval (0,1023) and usually contain three meaningful digits to the right of the decimal place. Note also, that reasonable user-to-satellite ranging estimates exist in the 60–100 ms range (20,000–30,000 km distances).

To obtain the first adjusted pseudo-range estimate, apr1, the estimate is equated to the initial pseudo-range estimate ipr1:

apr1=ipr1=72.4 ms

Subsequently, apr2 is developed from apr1, cp1, cp2, ipr1 and ipr2. At the trial position, note from the difference (ipr2−ipr1) that a particular code-chip of the globally synchronized GPS signal is expected to arrive from satellite_2 11.8 ms later than from satellite_1. Because the trial area has been constrained to a 75 km radius (¼ of code period), these operations allow a conservative assumption that any user in the trial area will observe a delay between satellites 1 and 2 which is in the range of:

(11.8−0.5)ms<delay<(11.8+0.5)ms

The fractional code delay indicated by the code phase measurements cp1 and cp2 can be examined to determine that the GPS signal arrives from satellite_1 (900−393.1)= 506.9 chips or 0.4955 ms ahead of the GPS signal received from satellite_2. Note that there are generally 1023 code-chips per millisecond.

As described above, a particular chip of the GPS signal from satellite_1 is expected to be received somewhere between 11.3 ms to 12.3 ms prior to receiving it from satellite_2. Thus, the delay observed by the user equals 11 ms plus some fractional offset or 12 ms plus some fractional offset. As the code phase measurements cp1 and cp2 indicate that the fractional difference between the two received signals is 0.4955 ms, two possible values for the delay between satellite_1 and satellite_2 signals are considered, namely 11.4955 ms and 12.4955 ms. Because the actual delay is expected to exist within the interval (11.3 ms, 12.3 ms), it may be assumed that the user receives the GPS signal from satellite_1 11.4955 ms sooner that transmitted by satellite_2. Note that it would be expected to be impossible to interpret this user-observed delay to be 12.4995 ms due to the trial position spacing constraint.

With this knowledge deduced from cp1 and cp2, a meaningful value may be assigned to the adjusted pseudo-range estimate for satellite_2.

apr1=72.4000 ms apr2 (apr1+11.4955) ms apr2=83.8955 ms

These same types of operations are then performed for cp3, cp4 and cp5 to obtain adjusted pseudo-range estimates for the third, fourth and fifth satellites respectively. Note that, for simplicity, the measurement (cp1) and the adjusted pseudo-range estimate (apr1) from satellite_1 may be used as a central reference. The resulting set of adjusted estimates is expected to reflect the relative code phase relationships demonstrated by the observed code phase measurements. Note that a small timing bias (½ ms typically worst-case) will be introduced into each of these adjusted pseudo-range estimates due to the assumption that apr1=ipr1. However, since this bias will be common to all adjusted pseudo-ranges, it may be harmlessly projected into the GPS receiver's overall timing bias.

The adjustment method described above may not be optimal in that it treats all pseudo-range estimates identically and processes them in an arbitrary order. As a result, the 75 km radial constraint is applied to handle the worst-case where measurements from two low-elevation antipodal satellites must be related. There are alternative ways to approach the adjustment of initial pseudo-range estimates. First, instead of arbitrarily selecting the first satellite as a reference, the satellite with the highest elevation relative to the trial position can be selected. The higher the satellite, the less the variability of its possible observed pseudo-ranges across the trial area. For instance, if a satellite above 50° can be observed, the radial constraint can be relaxed to around 90 km. Further, as the highest satellite for a given trial position approaches 90° in elevation, the radial constraint can be relaxed back toward the limit of 150 km discussed for the precise timing scenario above. Second, it is not mandatory that a single reference be employed. The adjustment of pseudo-range estimates can be ordered in such a way that satellites are sequentially related to the satellite which most closely shares its geometrical relation to the user. Consequently, various schemes can be implemented which allow the radial constraint to relax back into the 100–150 km range.

The five or more adjusted pseudo-range estimates can be utilized to achieve a simple GPS position fix (e.g. least squares). However, as described above, since the initial GPS time estimate contained at least ±1 ms of uncertainty, errors may have been introduced into the satellite positions computed from our time-driven orbital models. Such satellite positioning errors are negligible when the GPS time error is on the order of a few milliseconds. However, these types of timing errors generally begin to noticeably affect the final position fix once they extend into the several tens of milliseconds. This is especially true for lower elevation satellite signals that may exhibit Doppler shifts in the range of 3–5 kHz (2–3 code chips per second of timing error). An initial GPS timing error of a second or two may result in a position error of several hundred meters.

With five or more adjusted pseudo-range estimates obtained, it is possible to determine a set of adjusted pseudo-range estimates that produce an acceptable level of positioning error. This "fine-tuning" is accomplished by performing all of the above steps for multiple initial GPS time estimates. With N sets of five or more adjusted pseudo-range estimates, we can compute N different least squares position fixes in an over-determined fashion. Next the position fix with smallest least squares error quantity may be selected as the fix that was derived from the most correct initial GPS time estimate. The range and number of initial GPS time estimates processed can vary with the positioning accuracy desired for the particular implementation concerned. The products of such fine-tuning are a set of accurately adjusted pseudo-range estimates and an accurate position fix.

Referring again to FIG. 5, once a first trial position is selected (block 426) and estimated pseudo-ranges have been determined at block 428 for each of the five or more GPS satellites, an ordinary least-square position fix is calculated at block 430. The ordinary least-square fix is generated and maintained at block 430 to avoid recalculation following the consistency analysis as will be described herein so that the selected position fix will not have to be regenerated for the selected trial position.

The determination of the consistency of the fix at block 432, when using the preferred least-squares position fix approach of the present invention may be provided using an over-determined set of equations. The consistency of the least-squares solution is checked by performing a Q-R decomposition of the direction cosine matrix determined from the least-squares solution and multiplying the non-constrained dimensions of the transpose of the Q matrix by the delta pseudo-range values from the least squares solution. Using the non-constrained dimensions of the transpose of the Q matrix is performed using five or more satellites. The least-squares solution is as shown in equation (4).

$$H\Delta x = \Delta y \quad (4)$$

where $\Delta x = 4 \times 1$ matrix of calculated position and time error
$\Delta y = n \times 1$ matrix of calculated ranges to GPS satellites
$H = n \times 4$ direction-cosine matrix
n = the number of GPS satellites used for the fix
The consistency of the solution is checked as shown in (5).

$$b = \text{norm}(P\Delta y) \quad (5)$$

where b = metric which indicates the consistency solution in (4)
$P = (n-4) \times n$ Q matrix from QR decomposition of H
$\Delta y$ = same as in (4)

Assuming that one of the pseudo-range values has an error equivalent to an integer number of code lengths, i*300 km, and taking into account the fact that the rows of P are orthonormal, the computed value of b may be very large. Accordingly, using equation (5) as a consistency check, the trial position fixes calculated from equation (4) can be evaluated to see if the estimated pseudo-ranges are correct. However, this approach is based on having at least five GPS satellites visible to perform the self-consistency check.

Alternatively, when only four satellites are available, norm ($\Delta x$) can instead be used as a self-consistency check. However, if only four adjusted pseudo-range estimates are available, an over-determined set of equations is not present. For both scenarios of knowledge of GPS time described above (precise time and approximate time), a position fix may be computed at block 430 and the norm ($\Delta x$) may be used as a self-consistency check. Unfortunately, in the approximate-time case, the described fine-tuning performed to improve a poor initial GPS time estimate generally cannot be performed without code phase measurements from a fifth satellite. Consequently, a four-satellite position fix developed without the benefit of precise GPS time is expected to degrade in accuracy according to the magnitude of the initial GPS time estimate employed. In any event, when GPS time is known to at least 10 or 20 milliseconds, the associated positioning accuracy effects may be of negligible concern.

At block 434, if any trial positions remain to be calculated, operations proceed to block 436 for selection of the next candidate trial position, after which the operations from block 428–434 are repeated. Otherwise, at block 438, the position fix with the lowest self-consistency measure is selected as defining the position of mobile terminal 400 (block 438).

The invention has been generally described above in connection with FIG. 5 for an embodiment in which range and position information is calculated by mobile terminal 400. Alternatively, range and position fix calculations can be performed at a location remote from mobile terminal 400. This alternative approach may be preferred as it eliminates the need to provide the satellite ephemeris information to mobile terminal 400 which is required for the calculation of pseudo-ranges and position fixes. While it is possible to provide such information to mobile terminal 400, such as through transmissions from communication satellite 126 based on calculations performed remotely by the satellite communication system 120 deriving the ephemeris data from GPS satellite 302 communications, it is equally possible to provide code phase readings from mobile terminal 400 back to communication system 120 over a communication link with communication satellite 126 for remote calculation of these values.

Accordingly, mobile terminal 400 using GPS receiver 406 may simply obtain code phase readings from some or all of the visible GPS satellites 302 at block 422 and transfer the time-stamped code phase readings, along with the spot-beam identifier reflecting the spot-beam in which mobile terminal 400 is located, through a communication link to communication satellite 126. This information, as illustrated in FIG. 4, may then be downlinked to an earth (ground) station 410. Earth station 410 is further linked to GPS station 412 which obtains and locks on to the transmission from visible GPS satellites 302 including demodulating the signal to obtain satellite identification and ephemeris information.

GPS station 412 further includes the necessary means for determining satellite locations, timing and computing pseudo-ranges and position fixes from the available data using generally known techniques for GPS based position determination. GPS station 412 may utilize the spot-beam location information and measured code phase information from visible satellites obtained through earth station 410 to carry out the operations illustrated in FIG. 5 at blocks 424–438. It is also known that improved performance may be obtained in calculating a position fix when more than 5 satellites are visible to mobile terminal 400 by recomputation of the position fix at block 438 with the combination of GPS satellites 302 that provides the best Geometric Dilution of Precision (GDOP) measure.

Figure 5:
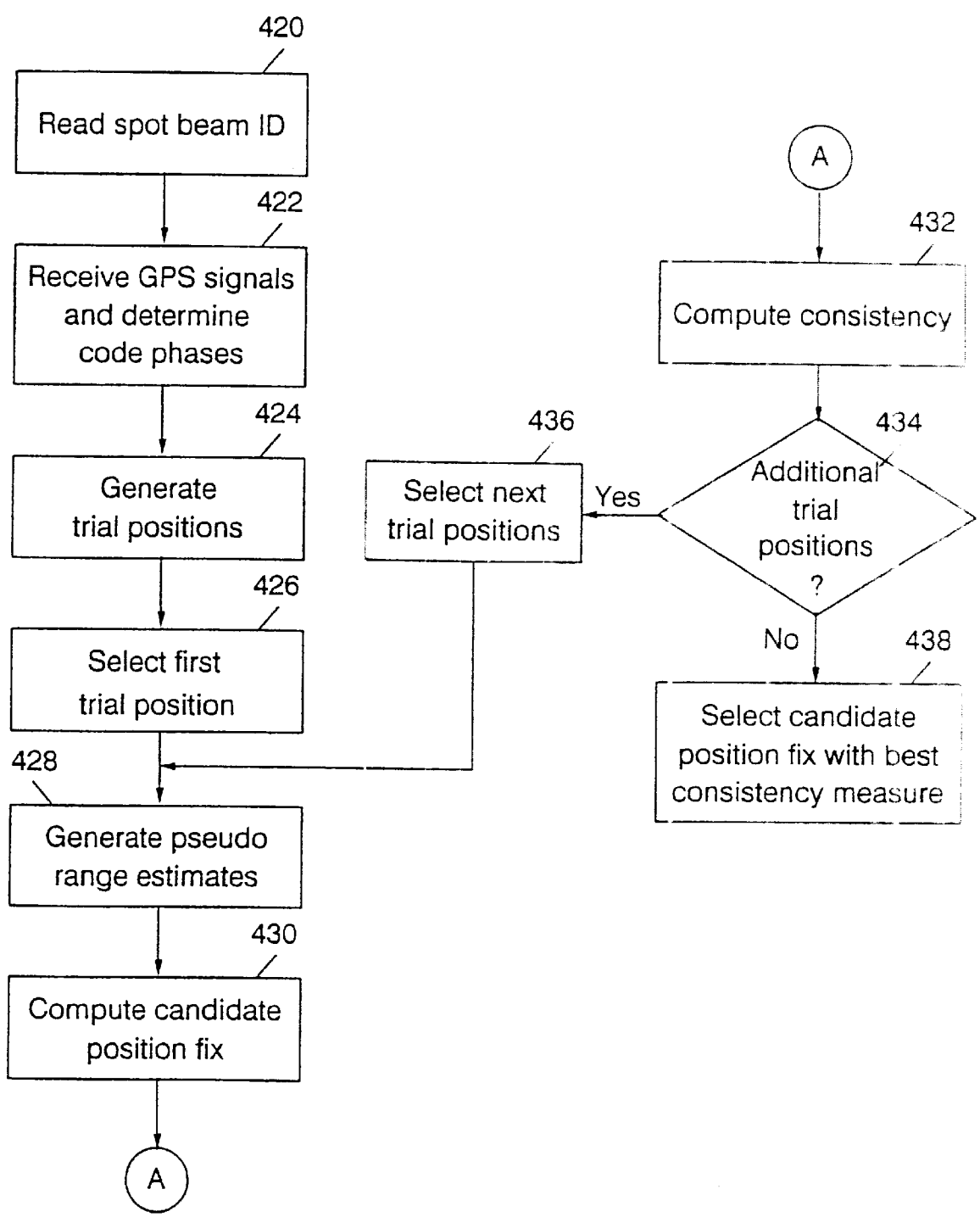
FIG. 5 is a flowchart illustrating position computation operations according to an embodiment of the present invention.

In an additional aspect of the present invention, a mobile terminal 400 obtains timing delay information from communication satellite 126 to obtain further performance improvements by modifying the operations used in generating the list of trial positions at block 424 of FIG. 5. This alternative approach is particularly advantageous for very large spot-beams as it reduces the number of trial positions required to resolve ambiguity according to the methods and systems of the present invention. This aspect of the invention uses timing information from communication satellite 126 to select trial positions for positions located no more than approximately 150 kilometers apart along an equal distance arc described by timing information obtained from the communication satellite 126. Depending upon the accuracy of the timing information available from communication satellite 126, a plurality of arcs may be required to obtain the sub-150 kilometer spacing desired. Even when multiple arcs are required, it is expected that a significant reduction in the number of trial positions may be obtained. This not only reduces computational burden, but it likely reduces the probability of making an incorrect position selection. This aspect of the present invention will now be described primarily with reference to the ACeS satellite communication system and the protocols used therein.

By way of background, mobile terminal 400 is capable of operating in two distinct modes: advantaged and disadvantaged. In advantaged mode of operation the mobile terminal 400 antenna 402 is not blocked by obstructions, and the signal level is sufficient so that normal call setup and voice communications can be performed. In disadvantaged mode of operation, the antenna 402 is blocked so that the received signal level is insufficient for call setup and voice communications. In disadvantaged mode of operation, special high-power channels exist for broadcasting, synchronization and paging. In a disadvantaged mode of operation mobile terminal 400 may not be able to register or otherwise establish contact with the system 120.

Figure 7:
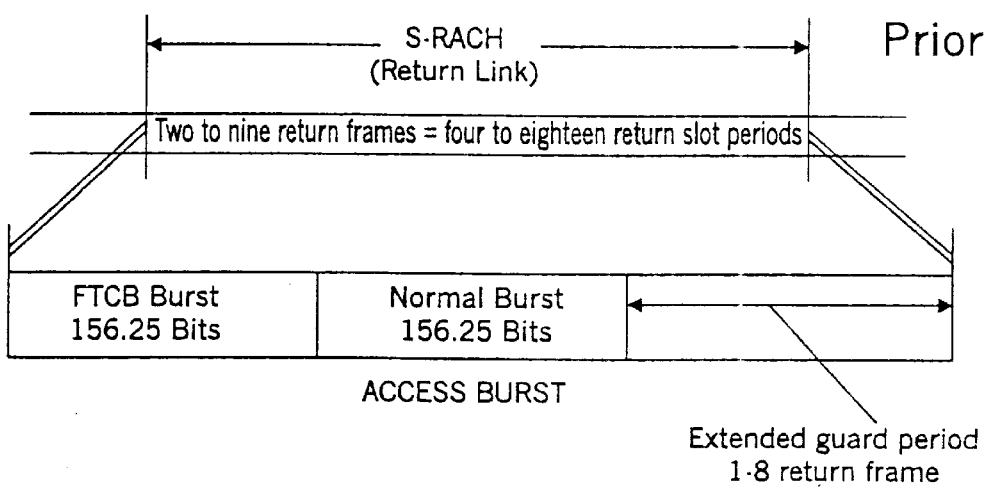
FIG. 7 illustrates an exemplary RACH access period for an ACeS satellite communication system.

In advantaged mode of operation, the mobile terminal 400 obtains timing information by sending a Random Access Channel (RACH) message. The RACH channel is a random access channel that uses a slotted-aloha scheme to increase throughput and reduce contention. A RACH access consists of two bursts followed by an extended guard period. FIG. 7 illustrates one RACH access period. The first of the two bursts is a Frequency and Time Correction Burst (FTCB) which is used to give the satellite 126 a known pattern to improve the detection of the information burst that follows. The second burst is a normal burst that carries the information content of the RACH message. The guard period is long enough so that a RACH burst sent from the farthest point or the closest point in a spot-beam 136 will not overlap with a RACH access burst in an adjacent RACH access period. Transmissions sent on the RACH channel are synchronized to signals on the downlink.

The mobile terminal 400 sends a RACH message at a point that corresponds to the timing of a mobile terminal 400 at the closest point in the spot-beam 136. The communication satellite 126 receives the RACH message and notes the difference in time of arrival of the RACH message relative to the start of the RACH access period. This difference is proportional to the location of mobile terminal 400 relative to the closest edge of the spot-beam 136. When the ACeS system assigns a dedicated control channel to the mobile terminal 400 it includes a field in the access grant control channel (AGCH) message that contains the round-trip timing delay from the RACH access. Both the RACH and AGCH channels are generally available only in advantaged modes of operation.

Figure 8B:
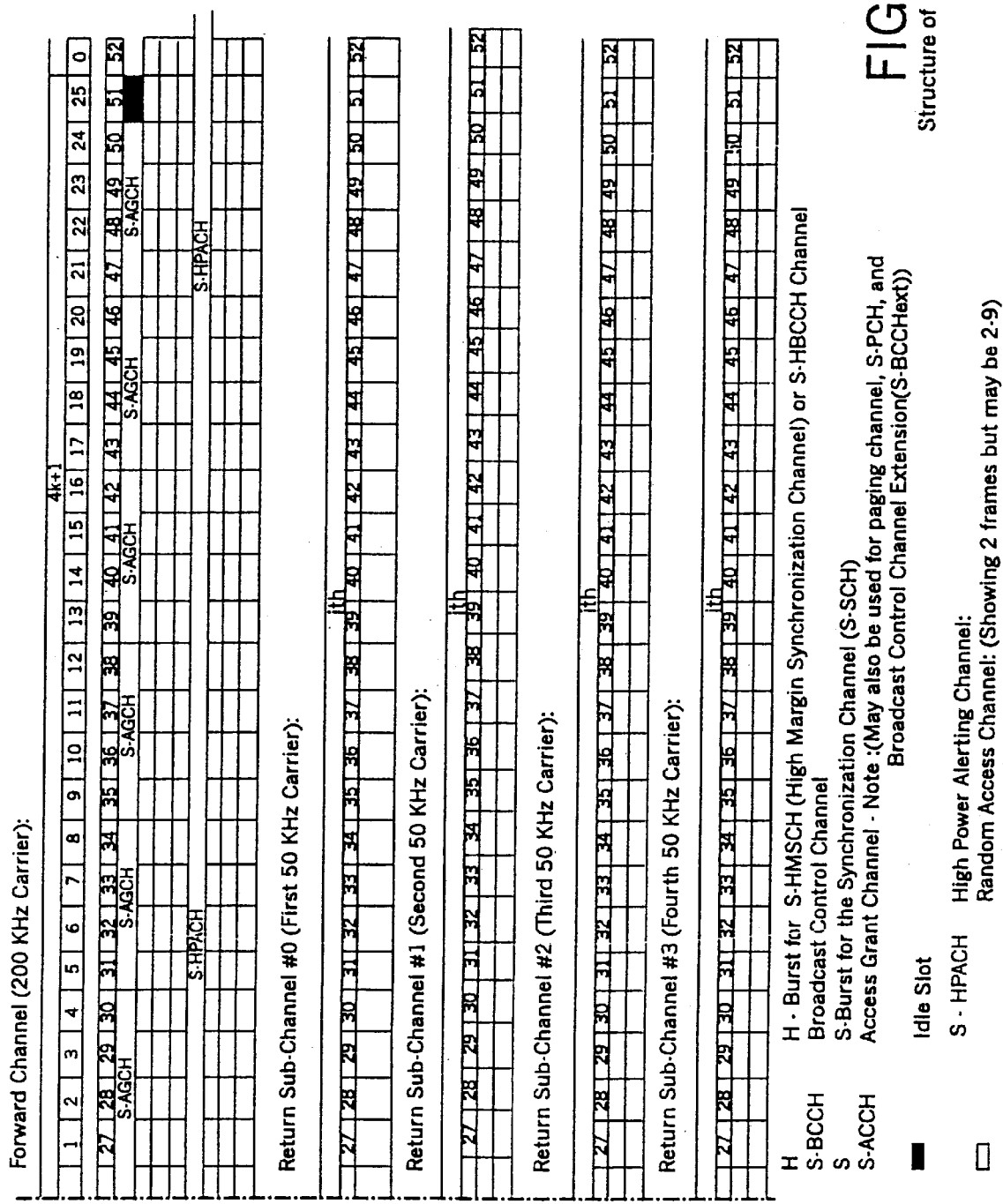
FIG. 8 illustrates an exemplary multiframe structure for an ACeS satellite communication system.

In the ACeS system, forward (downlink) channels from the satellite 126 to the mobile terminal 400 use one 200 KHz bandwidth carrier partitioned into eight time division multiple access (TDMA) slots. The corresponding reverse (uplink) channel uses four sub-carriers spaced at 50 KHz intervals with each sub-carrier partitioned into 2 TDMA slots. The downlink common control channels are mapped onto one 200 KHz bandwidth forward channel and the RACH channel is mapped onto one of the four corresponding 50 KHz uplink sub-carriers. FIG. 8 illustrates the mapping of the common control channels onto the forward and reverse channel carriers. Return sub-channel zero, as shown in FIG. 8 is configured so that RACH access periods have a period of 2-TDMA frames. In large spot-beams, the RACH access periods can be configured to be as long as 9 frame periods to prevent overlap of RACH accesses in adjacent RACH access periods.

The described ACeS protocol may be modified according to an embodiment of the present invention to allow a mobile terminal 400 operating in disadvantaged mode to obtain timing information corresponding to the round-trip delay between the satellite 126 and the mobile terminal 400. According to the present invention, the round-trip timing delay is then used in resolving the one-millisecond ambiguity in computing GPS pseudo-ranges. In order to obtain the timing information in disadvantaged mode, the ACeS air-interface is modified to add a High-Power Random Access Channel (HRACH). GPS satellite ephemeris and timing information may also be provided. The common control channels have four carriers in the reverse direction. Depending on capacity requirements desired to support the GPS functionality, one to three of the reverse sub-carriers are allocated to the HRACH channel. HRACH channels may also provide additional functionality to the ACeS system such as providing a method for the mobile terminal 400 to register in a disadvantaged mode.

For purposes of analyzing capacity, the RACH and HRACH channels are analyzed as slotted-aloha type multiple access schemes. Capacity of the HRACH access scheme can be calculated by assuming that access attempts are made at random intervals that have a Poisson distribution. The probability of k access attempts occurring during one HRACH time slot is as follows:

$$Pr[k]=G^k e^{-G}/k! \tag{9}$$

where G=mean number of access attempts per access slot
k=the number of attempts

The probability of zero access attempts during one HRACH access slot is then $e^{-G}$. The throughput, S, of the channel is then just the offered load, G, times the probability of no collisions occurring:

$$S=Ge^{-G} \tag{10}$$

G is the sum of all initial access attempts plus any retransmissions due to collisions. As the probability of no collisions is $e^{-G}$, the probability of a collision is $1-e^{-G}$. The probability of a successful transmission taking k attempts may be calculated as:

$$Pk = e^{-G}(1-e^{-G})^{k-1} \qquad (11)$$

The expected number of attempts to make a successful transmission is then:

$$E = \Sigma k Pk = e^{G} \qquad (12)$$

Taking the derivative of equation (10) and setting it to zero gives the point of maximum throughput which occurs for a mean offered load of 1 attempt per HRACH access slot. This results in a throughput of 36% with 2.7 attempts required to have one successful transmission. This is assuming zero errors in the received message at the satellite 126. The actual throughput may be lower due to non-zero bit-errors. Because paging would generally have a higher priority than timing update requests, the excess capacity of the High-Penetrating Alerting Channel (HPACH) would determine the actual throughput for timing update requests. Alternatively, additional bandwidth could be allocated on the common control channel to extend the capacity of the HPACH channel. Another alternative would be to create a separate logical channel that is similar to the HPACH, but which is used for supporting timing requests and other ancillary functions as needed. Any of these approaches would support disadvantaged operations according to the present invention.

In one embodiment of the present invention, the HRACH message contains information that is similar to that of the RACH message with slight modifications. Bit fields are included for partial International Subscriber Mobile Identification (IMSI), attempt number, and a random number for reducing the chances of a conflict between two mobile terminals 400 that make a request within a short time of each other. The information content of the HRACH message may contains 26 bits. Other formats could be used, such as picking a number at random to be used as a reference during the subsequent page with the timing update information. The random number could be considerably smaller than 26 bits and still provide a low probability of a conflict between two mobile terminals 400 making timing update requests almost simultaneously. Using a smaller random number would reduce the message size and result in greater throughput in the HRACH requests.

Figure 9:
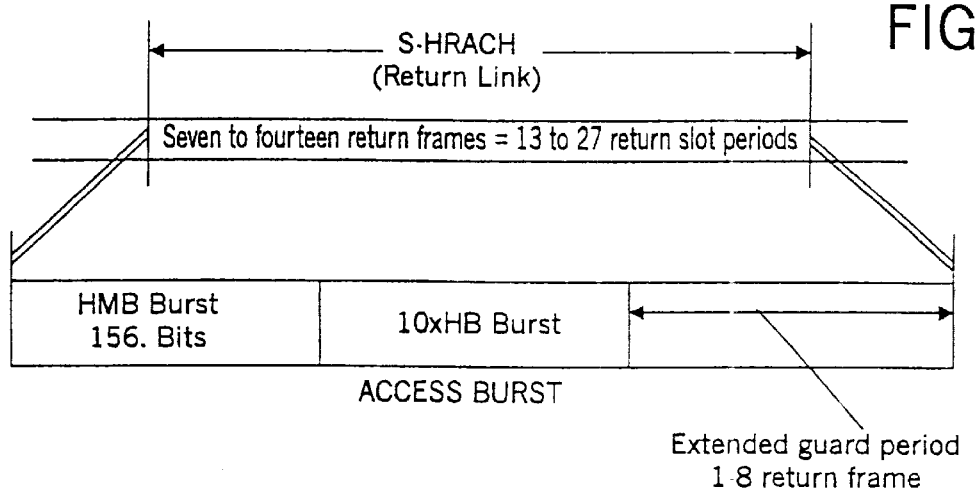
FIG. 9 illustrates an HRACH access period according to an embodiment of the present invention.

Coding of the HRACH in such embodiments may be similar to the HPACH channel with a rate of ½ Viterbi code and a (128,7) Walsh code which should give an approximate gain of 15 dB. Four tail bits and five checksum bits are then added to the 26 information bits to obtain a total of 35 bits. After coding, the message will consist of 1280 coded bits. The resulting message may be formatted as 10 high-margin bursts and one high-margin m-sequence burst. The high-margin m-sequence burst is added to the front of the HRACH access so that the satellite 126 can better synchronize and decode the high-margin bursts that follow it. The resulting HRACH burst format is illustrated in FIG. 9. It is to be understood that the coding scheme described herein is for illustration purposes only and that other coding formats could be used depending on the capacity requirements as well as the information content of the HRACH message.

Assuming that, for the ACeS system, one satellite 126 can support 2,000,000 users and there are 140 spot-beams 136 per satellite 126, each spot-beam can support approximately 14,285 users. In a worst-case situation, an HRACH access will then take 28 bursts which results in HRACH access period of 28* (60/26)=64.6 msecs. Using the expected peak throughput of 2.7 attempts per successful access, each HRACH access at peak capacity will take 64.6*2.7=174.46 msecs per successful access on the HRACH channel. This results in a peak capacity of 20,635 successful accesses per hour, not including retries due to lost HRACH frames. Dividing the capacity by the number of users in a spot-beam, results in one HRACH channel being able to support 1.44 accesses per hour per user. Additional capacity could be obtained by adding additional HRACH channels on other unused return sub-carriers. Additional coding gain could be realized by reducing the capacity of each HRACH channel and increasing the number of bursts.

Computed timing delay information may be provided to disadvantaged mobile terminals using the HPACH. The HPACH channel in ACeS is a high-power channel used for paging mobile terminals 400 that are operating in a disadvantaged mode. It uses a combination of increased transmitter power and additional coding to add approximately 20 dB of margin relative to a voice traffic channel operating in advantaged mode. An HPACH message consists of 53 bits. 50 bits are used to encode the paged mobile terminal 400 IMSI and 3 bits are spare bits. According to an embodiment of the present invention, one of the spare bits is used to indicate that the HPACH message is a response to a HRACH timing information request and the remaining 52 bits are used to encode a request reference number and the timing information measured during the HRACH access. The timing information uses 16 bits and the reference number uses 26 bits. The reference number is, preferably, an echo of the original 26 bits used for the HRACH access request described above.

Preferably, as mentioned previously, the HRACH channel would take advantage of the coding scheme already in use for the HPACH channel. The HPACH channel in ACeS uses a 16-state rate ½ Viterbi code followed by (128,7) Walsh code in combination with a 7 dB increase in transmitter power to obtain approximately a 20 dB increase in margin over the voice traffic channels used in advantaged modes of operation. However, to conserve mobile terminal power, the HRACH channel preferably uses the same coding scheme as the HPACH channel without increasing the transmitter power, which would result in the HRACH channel only having an increased margin of 12.6 dB over the voice traffic channels.

Figure 10:
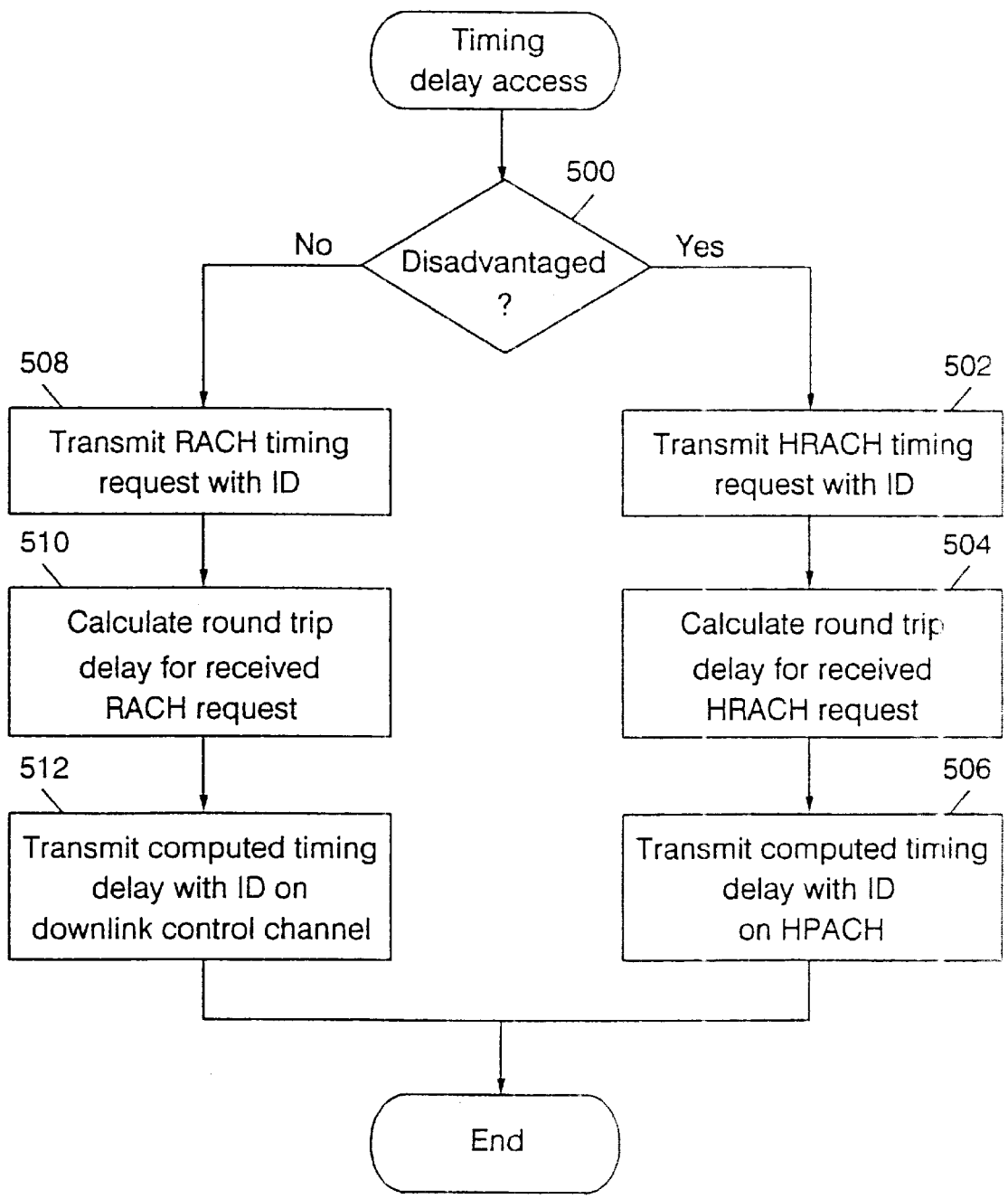
FIG. 10 is a flowchart illustrating timing delay acquisition operations according to an embodiment of the present invention.

Referring now to the flowchart of FIG. 10, timing delay request processing according to an embodiment of the present invention will now be generally described. At block 500, mobile terminal 400 determines whether it is an advantaged or disadvantaged position within satellite communication system 120. If it is in a disadvantaged position, operations move to block 502 and a HRACH timing request is transmitted including a request identifier. As described above, the identifier may be a randomly generated number with the number of bits chosen to provide a low likelihood of multiple requests with a common identifier being received from different mobile terminals concurrently.

At block 504, satellite 126 calculates a round trip delay for the received HRACH request. At block 506, satellite 126 transmits the computed timing delay along with an identifier on the HPACH channel for receipt by mobile terminal 400. The format for the identifier and transmission using the HRACH and HPACH have been previously described with reference to FIGS. 7–9 above.

If mobile terminal 400 is in an advantaged position, an alternative approach can be used as shown at blocks 508–512. However, it is to be understood that a mobile terminal in an advantaged position is also able to obtain timing delay information according to the operations as described at blocks 502–506 with the only disadvantage being utilization of the limited high power channel capacities for a non-disadvantaged terminal. Accordingly, as illustrated at block 508, the timing request may be transmitted by an advantaged mobile terminal using the RACH channel. The roundtrip timing delay is then calculated by communication system 120 based on the time of receipt of the RACH timing request. Furthermore, the timing delay information with the identifier may be transmitted to mobile terminal 400 on a downlink control channel that need not be a high power channel (block 512).

The disadvantage of utilizing alternative channels depending upon whether a terminal is disadvantaged or advantaged, is the requirement to modify the protocol of the communication system 120 to distinguish a timing request and to transmit timing information on two different types of channels. Accordingly, while additional capacity may be provided using this approach for disadvantaged terminals requesting timing delay information, the required modifications to existing communication systems 120 are simplified by treating all timing delay update requests from mobile terminals as being from disadvantaged terminals and processing those requests solely on high penetration channels. (Note that the term high penetration is intended to refer to high margin channels where the coding scheme may be adjusted to provide greater error recovery and/or the transmission power rate may be increased).

Figure 6:
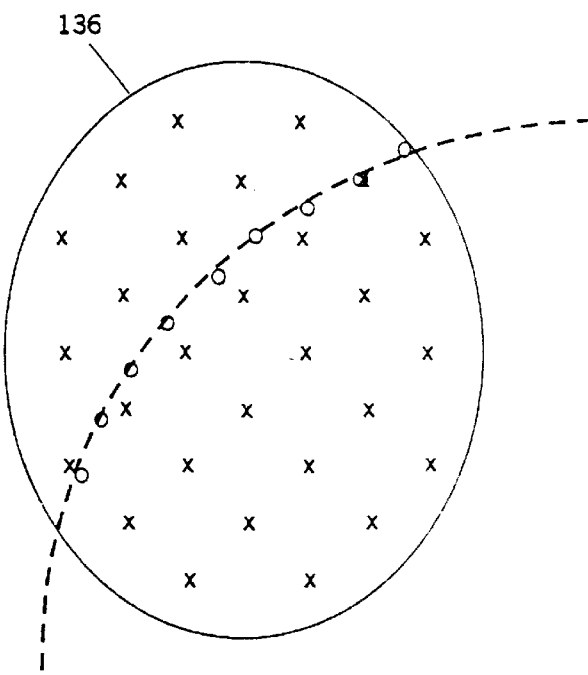
FIG. 6 illustrates selection of trial positions in a spot-beam according to two embodiments of the present invention.

Once the mobile terminal knows the timing delay information for its position within a spot-beam 136, operations from block 424 of FIG. 5 may be modified by calculating an arc of position in the current spot-beam to use as the set of trial positions for computing least-squares position fixes. As illustrated by the dotted line arc and "O" marks in FIG. 6, the trial positions are located on an arc of approximately equal distance from the communication satellite 126 and spaced laterally along the arc at a distance of no more than approximately 150 kilometers. So long as the timing delay accuracy is sufficient to insure that a single arc of positions will successfully cover the possible ambiguity positions within the spot-beam 136, a single arc of positions as illustrated in FIG. 6 is acceptable.

Normally, in an ACeS satellite system, upon entering a new spot-beam on a power up, a mobile terminal 400 attempts to register in the system 120 using a location update process. In performing the location update, mobile terminal 400 typically requests a dedicated control channel using a RACH access. When the ACeS system 120 assigns a dedicated control channel for the location update, it also includes timing information so that if mobile terminal 400 responds, it may adjust its transmitter timing so that reverse (uplink) transmission bursts from different mobile terminals are less likely to overlap at the satellite 126 receiver thereby reducing the likelihood of interference. The location updating process in this context refers to the process whereby the mobile terminal registers in a specific spot-beam 136 in satellite system 120 which operations occur regardless of whether or not the mobile terminal includes GPS position fix capabilities as described for the present invention but instead refers to normal communication operations over the satellite system 120.

With the trial position selected according to the present invention based on using the timing delay information from satellite communication system 120 to reduce uncertainty in mobile terminal position, the resolution of the timing advance is important. In an ACeS system, the resolution of the timing advance provided during a RACH access is typically 3.7 microseconds which provides for adjacent timing advance distances over land of less than 50 kilometers in most cases. However, in worst-case situations, for example, with spot-beams located directly under a satellite 126 at the equator, this resolution is degraded. It is, therefore, possible, for example, with spot-beams as described centered directly under an ACeS satellite 126, to have a region of uncertainty greater than 150 kilometers based on the resolution of the timing advance information.

In this specific case, it is preferred that extra trial positions be calculated to create a grid of trial positions maintaining the sub-150 kilometer interposition spacing. These can be provided by locating points along a plurality of spaced arcs and still provide for a reduction in the number of total trial positions as compared with an embodiment in which the entire spot-beam location is gridded with trial positions as illustrated by the "X" notations in FIG. 6. Furthermore, additional arcs may be required where the maximum reporting accuracy from fine timing alignment during a RACH access is unavailable, for example, in practice, in the ACeS system, it is possible for the timing resolution to be a fourth of the values represented as typical in the description provided herein.

In any event, the worst-case timing advance error should be considered for any satellite communication system 120 utilized to provide support to GPS position determination according to the present invention with trial positions chosen so that they form a coverage grid about the timing arc to compensate for a lack of resolution in the timing advance measurements. Using the timing delay information as described for this aspect of the present invention, other operational blocks as described in FIG. 5 proceed substantially identically except for the use of timing information to reduce the number of trial positions. Furthermore, as with the alternative embodiment described for FIG. 5, the various calculations described herein may be divided between the mobile terminal 400 and a GPS station 412 associated with a communication satellite 126 as shown in FIG. 4. Also note that, for purposes of the present invention, GPS station 412 need not be located within the same spot-beam as mobile terminal 400 to support operations according to the present invention.

As noted above, for the embodiments of the present invention in which the trial position fix calculations are carried out within mobile terminal 400, a means is preferably provided to provide necessary ephemeris data on GPS satellites 302 to mobile terminal 400 without the need for demodulating that information by mobile terminal 400 from the received GPS signals 304. Accordingly, one such approach for obtaining information allowing efficient calculation of position fixes at mobile terminal 400 in an ACeS system will now be provided. For this description, it is assumed that the desired GPS satellite timing and location information will be provided to mobile terminal 400 using communications from communication satellite 126 received and processed by satellite radiotelephone 404 and further provided from satellite radiotelephone 404 to GPS receiver 406 for use in calculating psuedo-ranges and position fixes.

According to the now provided embodiment, uncertainty in the GPS satellite 302 to mobile terminal 400 clock bias is bounded by using an accurate time transfer from the network control center (NCC) of ACeS satellite communication system 120 to mobile terminal 400 so that the GPS receiver 406 of mobile terminal 400 is provided an accurate knowledge of where the epochs of GPS satellite 302 time occur. The transfer of information will now be described as a series of steps.

1. A GPS receiver (GPS-Rx) 412 which is co-located at a NCC of system 120 issues a pulse at some time $t_0$ to the NCC. This pulse is intended to occur at an epoch of GPS time, but it is actually offset from true GPS time due to the time bias in GPS-RX ($b_k$) and propagation delays through circuitry and the connection between GPS-RX and NCC ($\tau_d$). Based on the speed of modem hardware and the assumption that GPS-RX and NCC are co-located, the total delay should be no more than 300 ns.

2. When the NCC receives the pulse from GPS-RX, it samples the state of its transmit (TX) air interface. Typically, the state includes the bit number within a frame, as well as the frame number within a hierarchical frame structure. The ACeS standard uses such a frame structure. The state in TDMA systems such as GSM and IS-136 also includes a timeslot number. The state of the TX air interface at $t_0$ is ($BN_0$, $TN_0$, $FN_0$) representing a bit, timeslot, and frame, respectively. Note that the NCC, through the Network Synchronization Subsystem (NSS) performs Pseudo-Noise Ranging (PN ranging) to estimate the range from the NCC to the ACeS satellite 126. This is done so that the uplink timing is adjusted to maintain the required downlink timing relationships. As such, before the time-transfer message is sent to the mobile terminal 400, the NCC adjusts the values of ($BN_0$, $TN_0$, $FN_0$) to subtract out the uplink propagation time as well as the processing delay through the ACeS satellite 126 (ACeS SV) taking into account the modulo properties of ($BN_0$, $TN_0$, $FN_0$).

3. The NCC transmits the state ($BN_0$, $TN_0$, $FN_0$) to the GPS receiver 406 (GPS-UT) either as a stand-alone message or as part of another message that is particular to the GPS assistance method employed. This transmission may be delivered either exclusively to the individual GPS-UT (point-to-point) or broadcast to all mobile terminals that are currently served by the ACeS satellite 126.

4. Prior to receiving the message, the GPS-UT must have gone through the process of locking frequency with the ACeS satellite 126 and synchronizing with satellite 126's air-interface state. This process is specified as part of the standard for the ACeS system. When the GPS-UT receives the message, it derives the time $t_0'$ to its GPS epoch by using ($BN_0$, $TN_0$, $FN_0$), Coarse Timing Advance (CTA), and Fine Timing Advance (FTA). The downlink propagation time, (CTA+FTA)/2 is converted to quarter bit periods, and it is subtracted from ($BN_0$, $TN_0$, $FN_0$) to give ($BN_0'$, $TN_0'$, $FN_0'$). This is done taking into account the modulo properties of ($BN_0$, $TN_0$, $FN_0$). After these steps have been completed, the GPS-UT has accurate knowledge that a GPS epoch occurred at the air-interface state ($BN_0'$, $TN_0'$, $FN_0'$) of mobile terminal 400.

5. If it is chosen to send the time-transfer as a point-to-point message, the NCC can pre-calculate ($BN_0'$, $TN_0'$, $FN_0'$) as it has knowledge of CTA and FTA. If a broadcast type time-transfer assistance message is chosen, then ($BN_0'$, $TN_0'$, $FN_0'$) are calculated in the mobile terminal.

Several considerations apply to the above operations. First, the FTA parameter is an important part of this method. If it is not used, then the GPS-UT would have a delay uncertainty from CTA up to the maximum one-way propagation delay for the particular spot-beam in which the mobile terminal is located. The FTA value can vary between 0 and 1250 depending on the position of the mobile terminal in the spot-beam. This corresponds to one-way propagation times of 0–2.3 msecs. When the FTA value is used, this uncertainty, in the ACeS example, is $\tau_B$=3.7 us (0–3.6 C/A code chips).

In addition, the time transfer relative to the GPS epoch affects operations but the type of epoch used in the transfer also has some impact on the GPS-UT. This is mainly dependent on how the time to of the pulse in GPS-RX relates to actual GPS time of week. If the pulse at to is based on a millisecond epoch of the C/A code, then, through the time transfer, the GPS-UT has knowledge of only this epoch. Alternatively, if the pulse at to is issued at a 20-ms GPS epoch, then the GPS-UT will have knowledge of the bit and code timing of the GPS satellite transmissions at the respective transmitters. This information may be combined with satellite position or range assistance information to provide an improved estimate of bit timing at the GPS-UT. This may remove the need for bit-synchronization, which may limit sensitivity or acquisition time performance in some cases. A third alternative is for GPS-RX to issue the pulse at a one-second GPS epoch, from which the GPS-UT can derive the bit and code timing. Although the one-second pulse does not add as much benefit to the time transfer, it may simplify implementation as commercial GPS receivers typically provide a 1-Hz output.

Furthermore, the accuracy of the transfer of the GPS epoch time from GPS-RX to the GPS-UT depends on several factors. The total time bias in the GPS-UT is given by:

$$b_{GPS-UT}=b_k+\tau_d+\epsilon_B+\epsilon_{TA}+\tau_{pd}, \quad (13)$$

where $b_k$=GPS-RX bias from true GPS time at MCS ($\mu$=0, $\sigma$≈100 ns);

$\tau_d$=propagation delay of pulse through GPS-RX/NCC path;

$\epsilon_{TA}$=error due to resolution of the TA parameter (uniform distribution over ±0.25 $\tau_{TA}$);

$\epsilon_B$=error due to bit-period resolution in ACeS air interface (uniform over 0–$\tau_B$);

$\tau_{pd}$=propagation delay GPS signals through the GPS-UT receiver.

$\tau_{TA}$=FTA resolution, 3.7 usecs.

$\tau_B$=bit period, 3.7 usecs.

If a value of 300 ns is assumed for both $\tau_d$ and $\tau_{pd}$, and a value of 500 ns is used to bound the bias in GPS-RX, then:

$$|b_{GPS-MS}|<1.1\ \mu s+0.25\ \tau_{TA}+0.5\ \tau_B \quad (14)$$

For the ACeS standard, $\tau_B=\tau_{TA}$=3.7 $\mu$s which indicates that $|b_{GPS-UT}|$<3.88 $\mu$s. Thus, the uncertainty due to GPS-UT time bias is less than ±4 chips of the C/A code.

Finally, the method described above does not require that the GPS-UT have knowledge of absolute GPS time. However, the time-transfer message from NCC to the GPS-UT can include a field that indicates the absolute GPS time for the epoch event. This is useful if the position-computation function is located in the GPS-UT as, when combined with valid ephemeris, it enables the GPS-UT to compute the satellite positions.

The present invention has been described with respect to FIGS. 5 and 10 which are flowchart illustrations of embodiments of the present invention. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the fictional specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method for determining a position of a mobile terminal comprising the steps of:
    obtaining an identification of a spot-beam in which the mobile terminal is located from a satellite radiotelephone system communication;
    generating a plurality of trial positions within the spot-beam;
    determining candidate position fixes for the mobile terminal for at least two of the plurality of trial positions based on GPS signals received by the mobile terminal from a plurality of global positioning system (GPS) satellites;
    selecting one of the determined candidate position fixes as the position of the mobile terminal; and
    wherein the determining step further comprises the steps of:
        calculating a plurality of initial pseudo-range estimates corresponding to the plurality of GPS satellites for one of the plurality of trial positions based on the GPS signals received by the mobile terminal, the GPS signals having a code length, including determining fractional code periods from the received GPS signals;
        adjusting the initial pseudo-range estimates to produce a plurality of candidate pseudo-range estimates for the mobile terminal for the one of the plurality of trial positions;
        generating the candidate position fix for the mobile terminal for the one of the plurality of trial positions based on the plurality of candidate pseudo-range estimates, and
        repeating the calculating, adjusting and generating steps for a second one of the plurality of trial positions.

2. A method according to claim 1 wherein the adjusting step includes the steps of:
    truncating each of the initial pseudo-range estimates to produce a corresponding plurality of integer code length distances for the one of the plurality of trial positions;
    adding distances corresponding to the fractional code periods derived from the received GPS signals to the plurality of integer code length distances to provide a corresponding plurality of candidate pseudo-range estimates for the mobile terminal.

3. A method according to claim 1 wherein the adjusting step includes the step of:
    modifying the plurality of initial pseudo-range estimates to account for relative differences between the fractional code periods derived from the received GPS signals to provide a corresponding plurality of candidate pseudo-range estimates for the mobile terminal.

4. A method according to claim 1 wherein the repeating step comprises the step of executing the calculating, adjusting and generating steps for each of the plurality of trial positions to provide candidate position fixes for the mobile terminal for each of the plurality of trial positions.

5. A method according to claim 4 wherein the step of repeating the determining step is preceded by the step of selecting the plurality of GPS satellites from visible GPS satellites based on the elevation of the visible GPS satellites relative to one of the plurality of trial positions.

6. A method according to claim 4 wherein the position fixes are least squares position fixes, wherein said step of repeating the determining step comprises the step of repeating the determining step for at least four GPS satellites and wherein the selecting step further comprises the step of selecting one of the candidate position fixes as the position of the mobile terminal based on a self-consistency check.

7. A method according to claim 6 wherein the selecting step comprises the step of selecting one of the determined candidate position fixes using an overdetermined set of equations.

8. A method according to claim 7 wherein the selecting step includes the steps of:
    Q-R decomposing a direction cosine matrix determined from the candidate position fixes; and
    multiplying non-constrained dimensions of a transpose of a Q matrix from the decomposing step by delta pseudo-range values from the candidate position fixes.

9. A method according to claim 1 wherein the step of generating a plurality of trial positions comprises the step of generating the plurality of trial positions wherein each of the trial positions is located no more than approximately 150 kilometers of another of the plurality of trial positions.

10. A method according to claim 9 wherein the step of generating a plurality of trial positions comprises the step of generating the plurality of trial positions on a grid covering the spot-beam.

11. A method according to claim 1 wherein the step of obtaining comprises the steps of:
    receiving a spot-beam identifier from the satellite radiotelephone system communication; and
    calculating a geographic location of the spot-beam based on the received spot-beam identifier.

12. A method according to claim 11 wherein the calculating step comprises the step of calculating the geographic location of the spot-beam based on satellite ephemeris data obtained from the satellite radiotelephone system communication and antenna direction coordinates.

13. A method according to claim 11 wherein the calculating step comprises the step of calculating the geographic location of the spot-beam based on boundary points for the spot-beam stored in the mobile terminal.

14. A method according to claim 1 further comprising the steps of:
    obtaining satellite communication timing information from the satellite radiotelephone system communication; and
    wherein the generating step comprises the step of generating a plurality of trial positions based on the obtained timing information.

15. A method according to claim 14 wherein the timing information is timing delay information and wherein the generating step comprises the step of selecting the plurality of trial positions along an arc of positions substantially equidistant from a satellite transmitting the satellite radiotelephone system communication based on the timing delay information.

16. A method for determining a position of a mobile terminal comprising the steps of:
   obtaining an identification of a spot-beam in which the mobile terminal is located from a satellite radiotelephone system communication;
   obtaining satellite communication timing information from the satellite radiotelephone system communication;
   generating a plurality of trial positions within the spot-beam based on the obtained timing information;
   determining candidate position fixes for the mobile terminal for at least two of the plurality of trial positions based on GPS signals received by the mobile terminal from a plurality of global positioning system (GPS) satellites;
   selecting one of the determined candidate position fixes as the position of the mobile terminal; and
   wherein the timing information is timing delay information and wherein the generating step comprises the step of selecting the plurality of trial positions along at least one arc of positions substantially equidistant from a satellite transmitting the satellite radiotelephone system communication based on the timing delay information wherein each of the trial positions is located no more than approximately 150 kilometers of another of the plurality of trial positions.

17. A method according to claim 14 wherein the obtaining step comprises the steps of:
   requesting the satellite communication timing information from a satellite radiotelephone system satellite on a high margin random access channel; and
   receiving the satellite communication timing information from the satellite radiotelephone system satellite on a high margin paging channel.

18. A method according to claim 17 wherein the satellite communication timing information is timing delay information and wherein the requesting step comprises the step of transmitting a request including a timing update request having a request number identifier and wherein the step of receiving comprises the step of receiving a timing update having an associated identifier corresponding to the request number identifier.

19. A method according to claim 1 wherein the repeating, calculating, adjusting and generating steps are performed by the mobile terminal.

20. A method according to claim 4 wherein the calculating step includes the steps of:
   receiving a GPS signal at the mobile terminal from each of the plurality of GPS satellites;
   determining a code phase for each of the plurality of GPS satellites from the received GPS signals at the mobile terminal; and
   providing the determined code phases with time-stamps to a remote GPS station from the mobile terminal; and
   wherein the repeating, calculating, adjusting and generating steps are performed by the GPS station.

21. A position computation system for a mobile terminal, comprising:
   means for obtaining an identification of a spot-beam in which the mobile terminal is located from a satellite radiotelephone system communication;
   means for generating a plurality of trial positions within the spot-beam;
   means for determining candidate position fixes for the mobile terminal for at least two of the plurality of trial positions based on global positioning system (GPS) signals received by the mobile terminal from a plurality of GPS satellites;
   means for selecting one of the determined candidate position fixes as the position of the mobile terminal; and
   wherein the means for determining further comprises:
      means for calculating a plurality of initial pseudo-range estimates corresponding to the plurality of GPS satellites for one of the plurality of trial positions based on the GPS signals received by the mobile terminal, the GPS signals having a code length, including determining fractional code periods from the received GPS signals;
      means for adjusting the initial pseudo-range estimates to produce a plurality of candidate pseudo-range estimates for the mobile terminal for the one of the plurality of trial positions; and
      means for generating the candidate position fix for the mobile terminal for the one of the plurality of trial positions based on the plurality of candidate pseudo-range estimates.

22. A system according to claim 21 wherein the means for adjusting further comprises:
   means for truncating each of the initial pseudo-range estimates to produce a corresponding plurality of integer code length distances for the one of the plurality of trial positions; and
   means for adding distances corresponding to the fractional code periods derived from the received GPS signals to the plurality of integer code length distances to provide a corresponding plurality of candidate pseudo-range estimates for the mobile terminal.

23. A system according to claim 21 wherein the means for adjusting further comprises:
   means for modifying the plurality of initial pseudo-range estimates to account for relative differences between the fractional code periods derived from the received GPS signals to provide a corresponding plurality of candidate pseudo-range estimates for the mobile terminal.

24. A system according to claim 21 further comprising means for selecting a plurality of GPS satellites from visible GPS satellites based on the elevation of the visible GPS satellites relative to one of the plurality of trial positions.

25. A system according to claim 21 wherein the position fixes are least squares position fixes and wherein the means for selecting comprises means for selecting one of the candidate position fixes as the position of the mobile terminal based on a self-consistency check.

26. A system according to claim 21 further comprising:
   means for obtaining satellite communication timing information from the satellite radiotelephone system communication; and
   wherein the means for generating comprises means for generating a plurality of trial positions based on the obtained timing information.

27. A position computation system for a mobile terminal, comprising:
   means for obtaining an identification of a spot-beam in which the mobile terminal is located from a satellite radiotelephone system communication;
   means for obtaining satellite communication timing information from the satellite radiotelephone system communication;
   means for generating a plurality of trial positions within the spot-beam based on the obtained timing information;

means for determining candidate position fixes for the mobile terminal for at least two of the plurality of trial positions based on global positioning system (GPS) signals received by the mobile terminal from a plurality of GPS satellites;

means for selecting one of the determined candidate position fixes as the position of the mobile terminal; and wherein the timing information is timing delay information and wherein the means for generating comprises means for selecting the plurality of trial positions along at least one arc of positions substantially equidistant from a satellite transmitting the satellite radiotelephone system communication based on the timing delay information wherein each of the trial positions is located no more than approximately 150 kilometers of another of the plurality of trial positions.

28. A system according to claim 26 wherein the means for obtaining comprises:

means for requesting the satellite communication timing information from a satellite radiotelephone system satellite on a high margin random access channel; and means for receiving the satellite communication timing information from the satellite radiotelephone system satellite on a high margin paging channel.

29. A position computation system for a mobile terminal, comprising:

means for obtaining an identification of a spot-beam in which the mobile terminal is located from a satellite radiotelephone system communication;

means for requesting satellite communication timing information from a satellite radiotelephone system satellite on a high margin random access channel;

means for receiving the satellite communication timing information from the satellite radiotelephone system satellite on a high margin paging channel;

means for generating a plurality of trial positions within the spot-beam based on the obtained timing information;

means for determining candidate position fixes for the mobile terminal for at least two of the plurality of trial positions based on global positioning system (GPS) signals received by the mobile terminal from a plurality of GPS satellites;

means for selecting one of the determined candidate position fixes as the position of the mobile terminal; and wherein the satellite communication timing information is timing delay information and wherein the means for requesting comprises means for transmitting a request including a timing update request having a request number identifier and wherein the means for receiving comprises means for receiving a timing update having an associated identifier corresponding to the request number identifier.

30. A system according to claim 21 wherein the means for calculating comprises:

means for receiving a GPS signal at the mobile terminal from each of the plurality of GPS satellites;

means for determining a code phase for each of the plurality of GPS satellites from the received GPS signals at the mobile terminal; and means for providing the determined code phases with time-stamps to a remote GPS station from the mobile terminal for determination of the candidate position fixes and selection of one of the determined candidate position fixes as the position of the mobile terminal at the GPS station.

31. A method for determining a position of a mobile terminal comprising the steps of:

obtaining an identification of a geographic area in which the mobile terminal is located from a wireless communication system;

generating a plurality of trial positions within the identified geographic area;

determining candidate position fixes for the mobile terminal for at least two of the plurality of trial positions based on GPS signals received by the mobile terminal from a plurality of global positioning system (GPS) satellites;

selecting one of the determined candidate position fixes as the position of the mobile terminal; and wherein the determining step further comprises the steps of:

calculating a plurality of initial pseudo-range estimates corresponding to the plurality of GPS satellites for one of the plurality of trial positions based on the GPS signals received by the mobile terminal, the GPS signals having a code length, including determining fractional code periods from the received GPS signals;

adjusting the initial pseudo-range estimates to produce a plurality of candidate pseudo-range estimates for the mobile terminal for the one of the plurality of trial positions;

generating the candidate position fix for the mobile terminal for the one of the plurality of trial positions based on the plurality of candidate pseudo-range estimates, and repeating the calculating, adjusting and generating steps for a second one of the plurality of trial positions.

32. A position computation system for a mobile terminal, comprising:

means for obtaining an identification of a geographic area in which the mobile terminal is located from a wireless communication system;

means for generating a plurality of trial positions within the identified geographic area;

means for determining candidate position fixes for the mobile terminal for at least two of the plurality of trial positions based on GPS signals received by the mobile terminal from a plurality of global positioning system (GPS) satellites;

means for selecting one of the determined candidate position fixes as the position of the mobile terminal; and wherein the means for determining further comprises:

means for calculating a plurality of initial pseudo-range estimates corresponding to the plurality of GPS satellites for one of the plurality of trial positions based on the GPS signals received by the mobile terminal, the GPS signals having a code length, including determining fractional code periods from the received GPS signals;

means for adjusting the initial pseudo-range estimates to produce a plurality of candidate pseudo-range estimates for the mobile terminal for the one of the plurality of trial positions; and means for generating the candidate position fix for the mobile terminal for the one of the plurality of trial positions based on the plurality of candidate pseudo-range estimates.

* * * * *